（12）United States Patent
Hee-Hanson et al.

(10) Patent No.: US 12,539,367 B1
(45) Date of Patent: Feb. 3, 2026

(54) MEDICAMENT DELIVERY DEVICE

(71) Applicant: Genzyme Corporation, Cambridge, MA (US)

(72) Inventors: Alexander Hee-Hanson, Melbourn (GB); Thomas Lever, Melbourn (GB); Michael Parrott, Melbourn (GB); Robert Wilson, Melbourn (GB); Haiming Wu, Weston, MA (US)

(73) Assignee: Genzyme Corporation, Cambridge, MA (US)

( * ) Notice: Subject to any disclaimer, the term of this patent is extended or adjusted under 35 U.S.C. 154(b) by 0 days.

(21) Appl. No.: 19/064,414

(22) Filed: Feb. 26, 2025

(51) Int. Cl.
*A61M 5/20* (2006.01)
*A61M 5/32* (2006.01)

(52) U.S. Cl.
CPC ........ *A61M 5/2033* (2013.01); *A61M 5/3202* (2013.01); *A61M 5/3243* (2013.01); *A61M 2005/2073* (2013.01)

(58) Field of Classification Search
CPC . A61M 5/2033; A61M 5/3202; A61M 5/3243
See application file for complete search history.

(56) References Cited

U.S. PATENT DOCUMENTS

| 2,522,961 | A | 9/1950 | William |
|---|---|---|---|
| 2,633,267 | A | 3/1953 | Lebus |
| 3,886,513 | A | 5/1975 | Smith et al. |
| 4,801,295 | A | 1/1989 | Spencer |
| 5,045,062 | A | 9/1991 | Henson |
| 5,176,275 | A | 1/1993 | Bowie |
| 5,328,484 | A | 7/1994 | Somers et al. |
| 5,396,051 | A | 3/1995 | Kuhn et al. |
| 5,478,316 | A | 12/1995 | Bitdinger et al. |
| 5,505,324 | A | 4/1996 | Danico |
| 5,505,706 | A | 4/1996 | Maus et al. |
| 5,536,917 | A | 7/1996 | Suppelsa et al. |
| 5,622,274 | A | 4/1997 | Bright |

(Continued)

FOREIGN PATENT DOCUMENTS

| DE | 3921747 A1 | 1/1991 |
|---|---|---|
| EP | 3501577 A1 | 6/2019 |

(Continued)

OTHER PUBLICATIONS

Hamers-Casterman et al., "Naturally occurring antibodies devoid of light chains," Nature, Jun. 3, 1993, 363(6428):446-448.

(Continued)

*Primary Examiner* — Dung T Ulsh
(74) *Attorney, Agent, or Firm* — Fish & Richardson P.C.

(57) ABSTRACT

A medicament delivery device comprising: a proximal end and a distal end defining a longitudinal axis; a body; a button arranged at the proximal end and configured to actuate the medicament delivery device; and a lock ring configured to rotate relative to the body about the longitudinal axis between a first position in which the button is not permitted to move along the longitudinal axis relative to the body, and a second position in which the button is permitted to move along the longitudinal axis relative to the body; wherein movement of the lock ring from the first position towards the second position causes the button to move along the longitudinal axis relative to the body.

20 Claims, 14 Drawing Sheets

(56) References Cited

U.S. PATENT DOCUMENTS

| | | | |
|---|---|---|---|
| 5,738,658 A | 4/1998 | Maus et al. | |
| 5,984,899 A | 11/1999 | D'Alessio et al. | |
| 6,080,461 A | 6/2000 | Wozniak et al. | |
| 6,394,985 B1 | 5/2002 | Lin | |
| 7,762,981 B2 | 7/2010 | Dacquay et al. | |
| 7,887,506 B1 | 2/2011 | Smolyarov et al. | |
| 7,918,824 B2 | 4/2011 | Bishop et al. | |
| 8,133,198 B2 | 3/2012 | Neer | |
| 8,409,138 B2 | 4/2013 | James et al. | |
| 8,734,394 B2 * | 5/2014 | Adams | A61M 5/326 |
| | | | 604/242 |
| 9,044,553 B2 | 6/2015 | James et al. | |
| 9,402,957 B2 | 8/2016 | Adams et al. | |
| 9,474,780 B2 | 10/2016 | Bokvist et al. | |
| 9,872,961 B2 | 1/2018 | Fourt et al. | |
| 10,118,001 B2 | 11/2018 | Fourt et al. | |
| 10,314,981 B2 | 6/2019 | Sampson et al. | |
| 10,350,362 B2 | 7/2019 | Dennis, Jr. et al. | |
| 10,363,377 B2 | 7/2019 | Atterbury et al. | |
| 11,298,462 B2 * | 4/2022 | Atterbury | A61M 5/283 |
| 11,331,432 B2 | 5/2022 | Holmqvist et al. | |
| 11,357,820 B2 | 6/2022 | Corvari et al. | |
| 11,369,751 B2 | 6/2022 | Ruan et al. | |
| 11,452,821 B2 | 9/2022 | LaFever et al. | |
| 12,465,697 B1 | 11/2025 | Hee-Hanson et al. | |
| 2002/0055712 A1 | 5/2002 | Neracher | |
| 2004/0039336 A1 | 2/2004 | Amark et al. | |
| 2005/0101919 A1 | 5/2005 | Brunnberg | |
| 2005/0273061 A1 | 12/2005 | Hommann et al. | |
| 2006/0224124 A1 | 10/2006 | Scherer | |
| 2007/0270777 A1 | 11/2007 | Dacquay et al. | |
| 2008/0097311 A1 | 4/2008 | Dacquay et al. | |
| 2008/0097390 A1 | 4/2008 | Dacquay et al. | |
| 2008/0269692 A1 | 10/2008 | James et al. | |
| 2009/0036868 A1 | 2/2009 | Pinedjian et al. | |
| 2009/0281496 A1 | 11/2009 | Matusch | |
| 2010/0049125 A1 | 2/2010 | James et al. | |
| 2010/0211005 A1 | 8/2010 | Edwards et al. | |
| 2011/0054414 A1 | 3/2011 | Shang et al. | |
| 2011/0144594 A1 | 6/2011 | Sund et al. | |
| 2011/0202011 A1 | 8/2011 | Wozencroft | |
| 2011/0319813 A1 | 12/2011 | Kamen et al. | |
| 2012/0310172 A1 | 12/2012 | MacDonald et al. | |
| 2013/0237921 A1 | 9/2013 | Lannan et al. | |
| 2013/0267897 A1 | 10/2013 | Kemp et al. | |
| 2014/0236076 A1 | 8/2014 | Marshall et al. | |
| 2014/0249483 A1 | 9/2014 | Kiilerich et al. | |
| 2014/0263156 A1 | 9/2014 | Newsom et al. | |
| 2014/0276637 A1 | 9/2014 | Massey, Jr. | |
| 2015/0246180 A1 | 9/2015 | Fenlon et al. | |
| 2015/0273162 A1 | 10/2015 | Holmqvist | |
| 2016/0001015 A1 | 1/2016 | Kucuk et al. | |
| 2016/0354555 A1 | 12/2016 | Gibson et al. | |
| 2016/0367763 A1 | 12/2016 | Tschirren et al. | |
| 2017/0215699 A1 | 8/2017 | Ouyang et al. | |
| 2017/0216526 A1 | 8/2017 | Brereton et al. | |
| 2017/0224929 A1 | 8/2017 | Sampson et al. | |
| 2017/0246403 A1 | 8/2017 | Cowe et al. | |
| 2017/0361034 A1 | 12/2017 | Scheller et al. | |
| 2018/0250471 A1 | 9/2018 | Grimoldby et al. | |
| 2018/0339114 A1 | 11/2018 | Wendland et al. | |
| 2019/0030249 A1 * | 1/2019 | Gonzalez | A61M 5/3271 |
| 2019/0192785 A1 | 6/2019 | Wendland et al. | |
| 2019/0298924 A1 | 10/2019 | Gibson et al. | |
| 2019/0366000 A1 | 12/2019 | Cowe et al. | |
| 2020/0114041 A1 | 4/2020 | Alas et al. | |
| 2020/0316314 A1 | 10/2020 | Buri et al. | |
| 2021/0077732 A1 | 3/2021 | Egelhofer | |
| 2021/0196900 A1 | 7/2021 | Apply et al. | |
| 2022/0015429 A1 | 1/2022 | Brown et al. | |
| 2022/0176042 A1 | 6/2022 | Belisle | |
| 2022/0395640 A1 | 12/2022 | Schwartzentruber | |
| 2023/0001099 A1 | 1/2023 | Dunn | |
| 2023/0238105 A1 | 7/2023 | Schneider et al. | |
| 2023/0347074 A1 | 11/2023 | Gavin | |
| 2024/0009397 A1 | 1/2024 | In et al. | |
| 2024/0307620 A1 * | 9/2024 | Fiard | A61M 5/3216 |
| 2024/0335613 A1 * | 10/2024 | Carrel | A61M 5/31571 |

FOREIGN PATENT DOCUMENTS

| | | |
|---|---|---|
| WO | WO 2002/047746 A1 | 6/2002 |
| WO | WO 2004/058820 A2 | 7/2004 |
| WO | WO 2004/068820 A2 | 8/2004 |
| WO | WO 2005/018629 A1 | 3/2005 |
| WO | WO 2006/003388 A2 | 1/2006 |
| WO | WO 2006/030220 A1 | 3/2006 |
| WO | WO 2011/109205 A2 | 9/2011 |
| WO | WO 2016/081238 A1 | 5/2016 |
| WO | WO 2019/074788 A1 | 4/2019 |
| WO | WO 2020/190529 A1 | 9/2020 |

OTHER PUBLICATIONS

Holt et al., "Domain antibodies: proteins for therapy," Trends in Biotechnology, Nov. 2003, 21(11):484-490.

Muyldermans, "Single domain camel antibodies: current status," Reviews in Molecular Biotechnology, Jun. 2001, 74(4):277-302.

Needle-based injection systems for medical use requirements and test methods, Part 1: Needle injection systems, ISO 11608-1:2014(E), Third Edition, Switzerland, ISO, Dec. 15, 2014, pp. 1-13.

Ward et al., "Binding activities of a repertoire of single immunoglobulin variable domains secreted from *Escherichia coli*," Nature, Oct. 1, 1989, 341(6242):544-546.

U.S. Appl. No. 19/064,155, filed Feb. 26, 2025, Alexander Hee-Hanson.

* cited by examiner

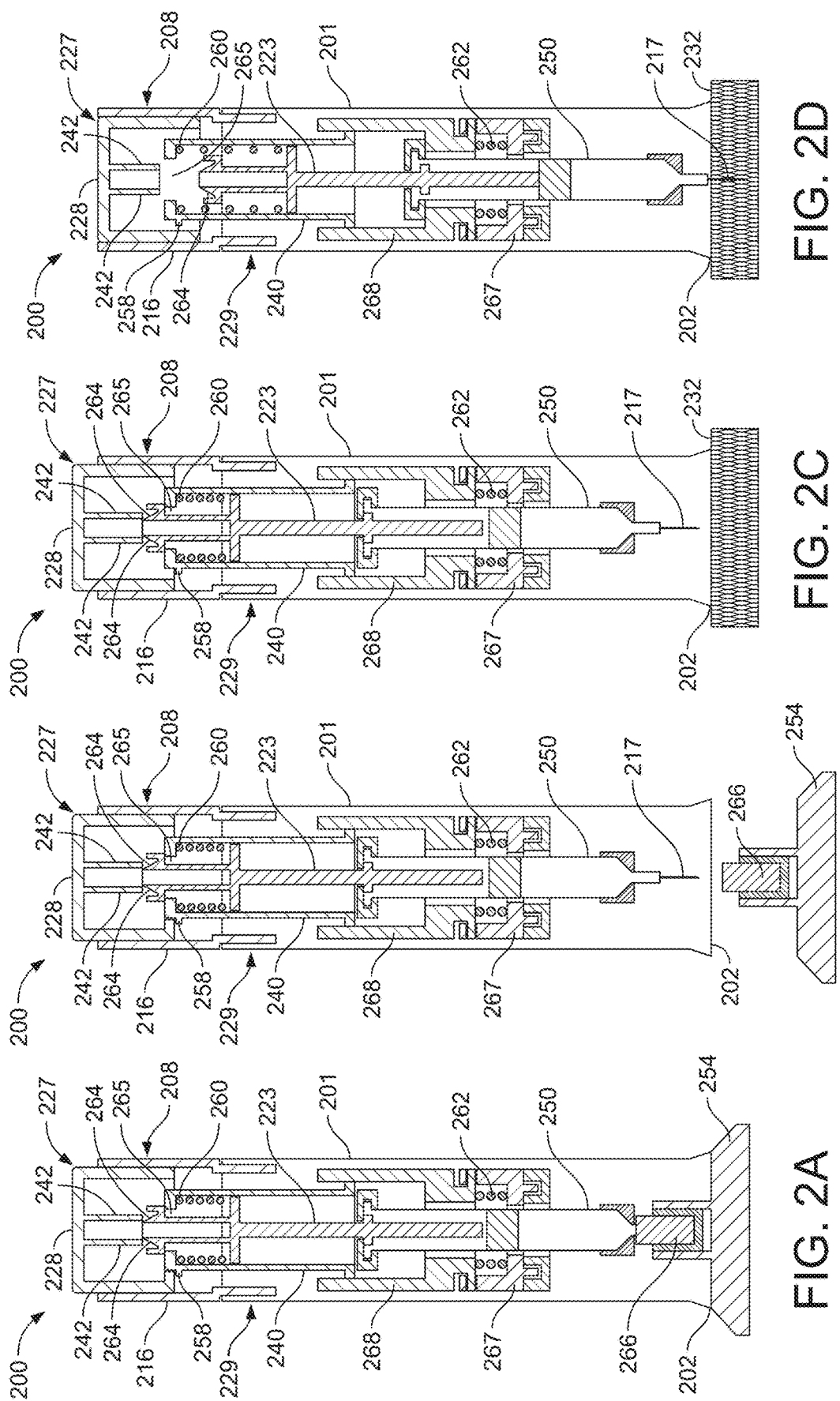

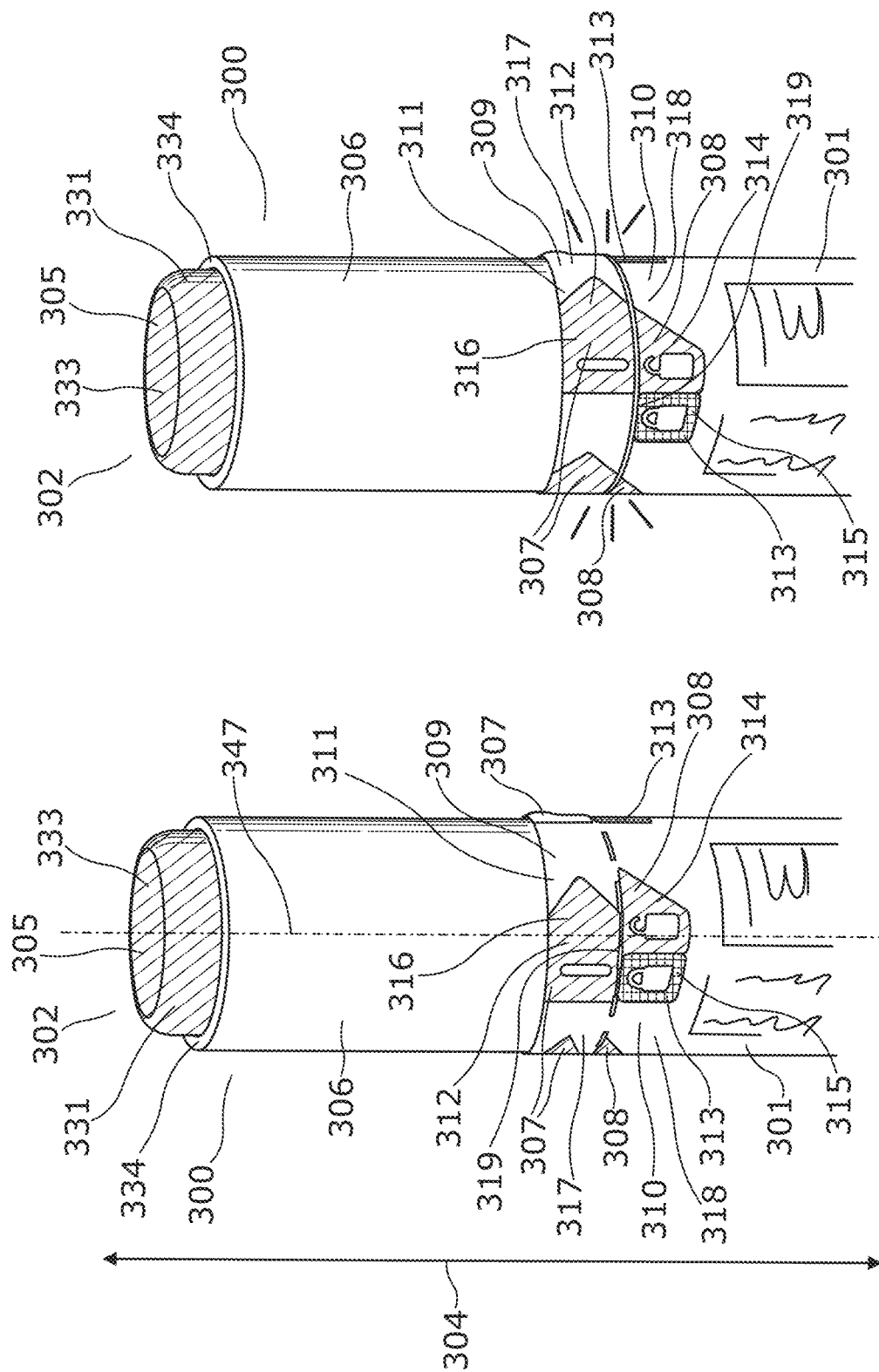

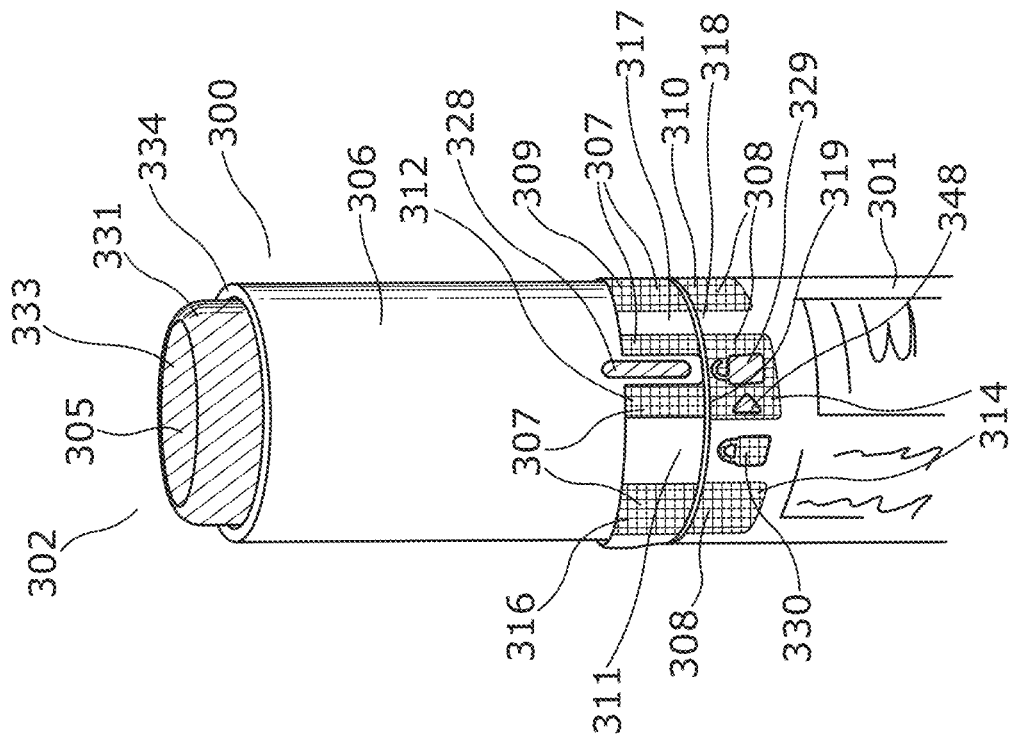
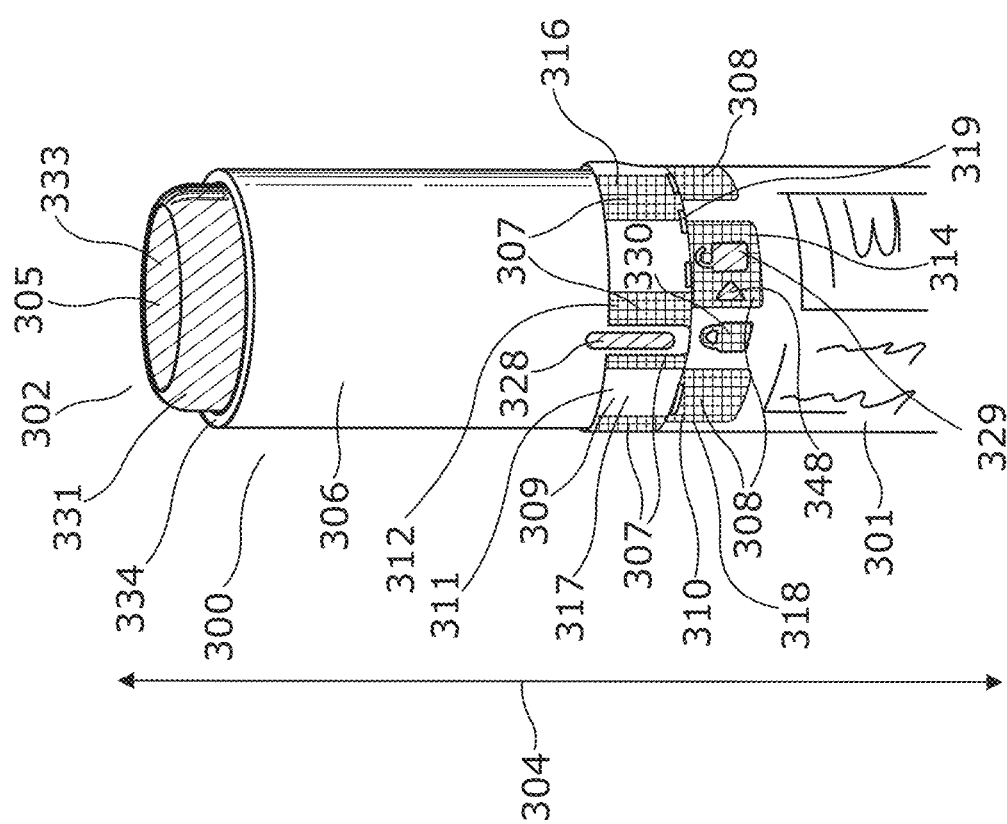
FIG. 4A
FIG. 4B

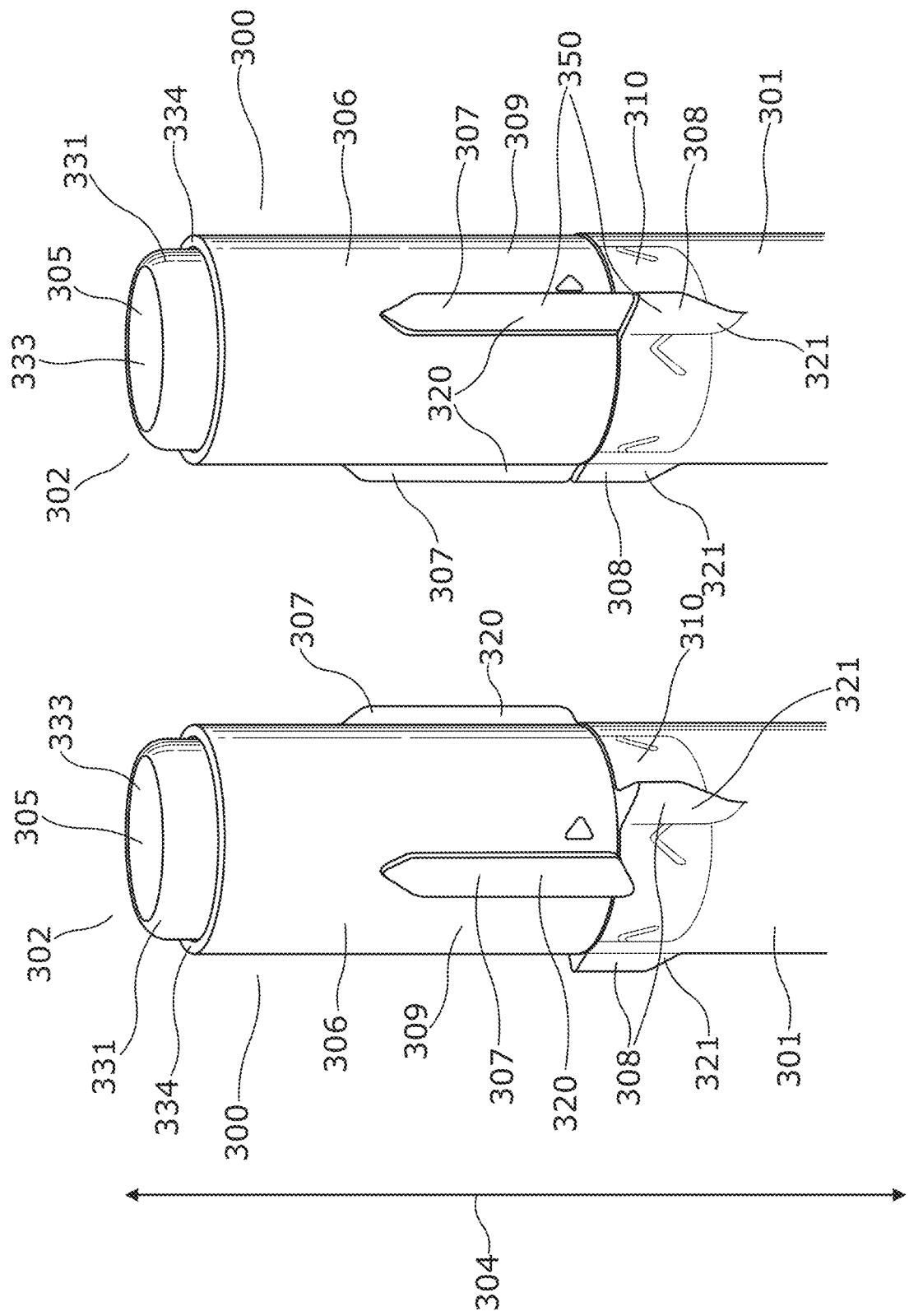

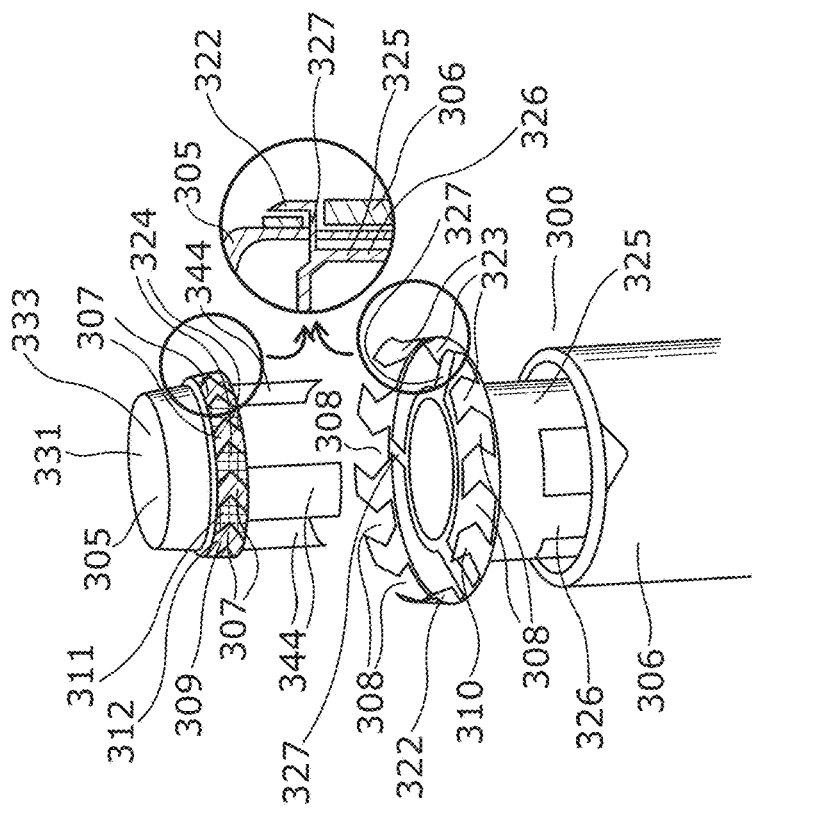
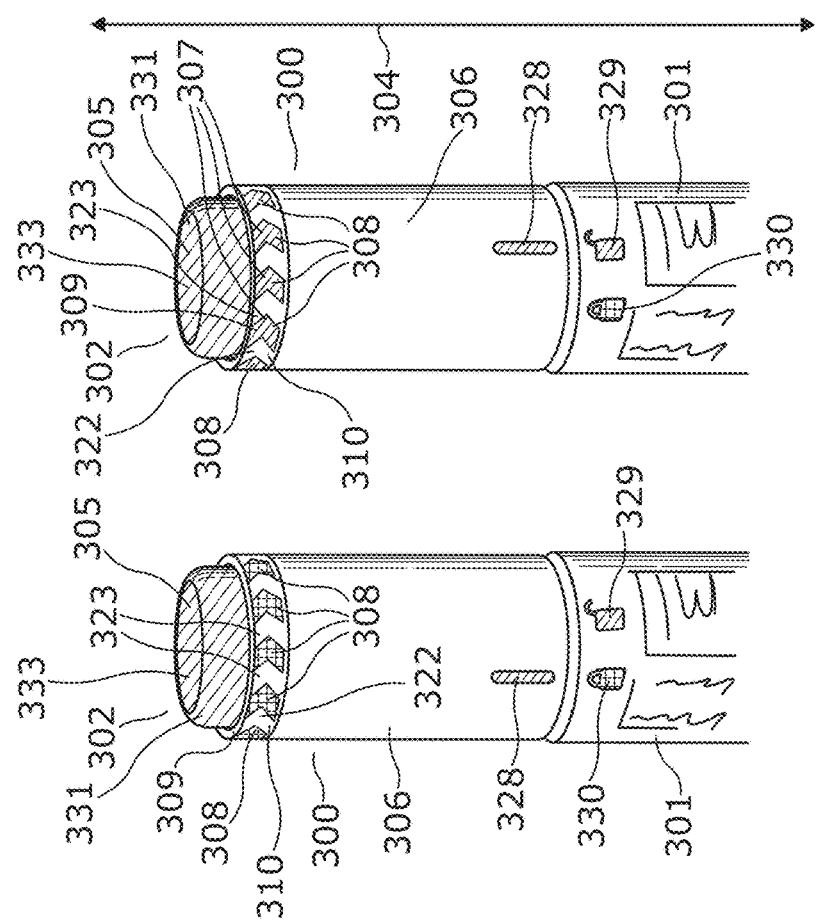
FIG. 7A  FIG. 7B  FIG. 8

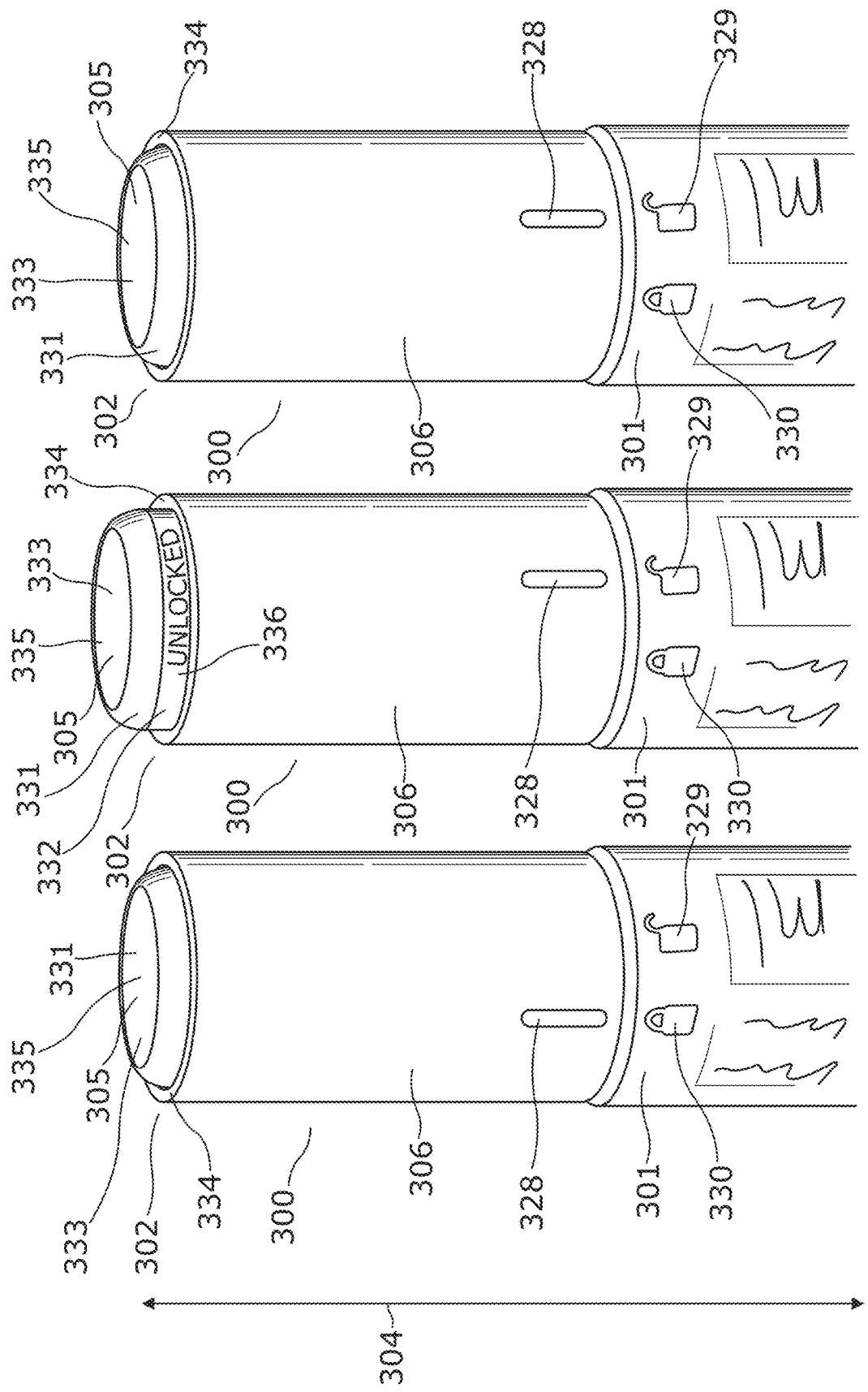

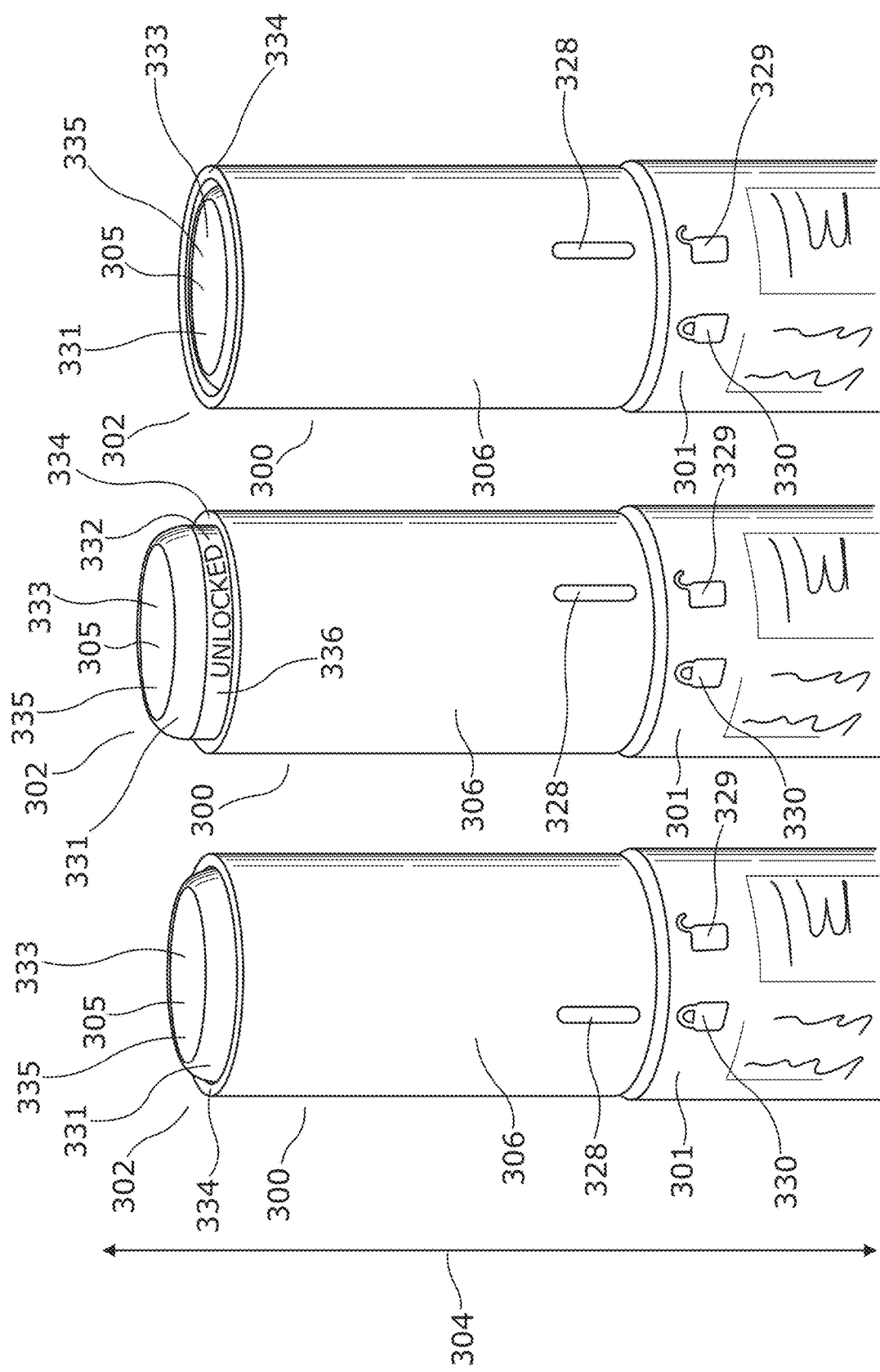

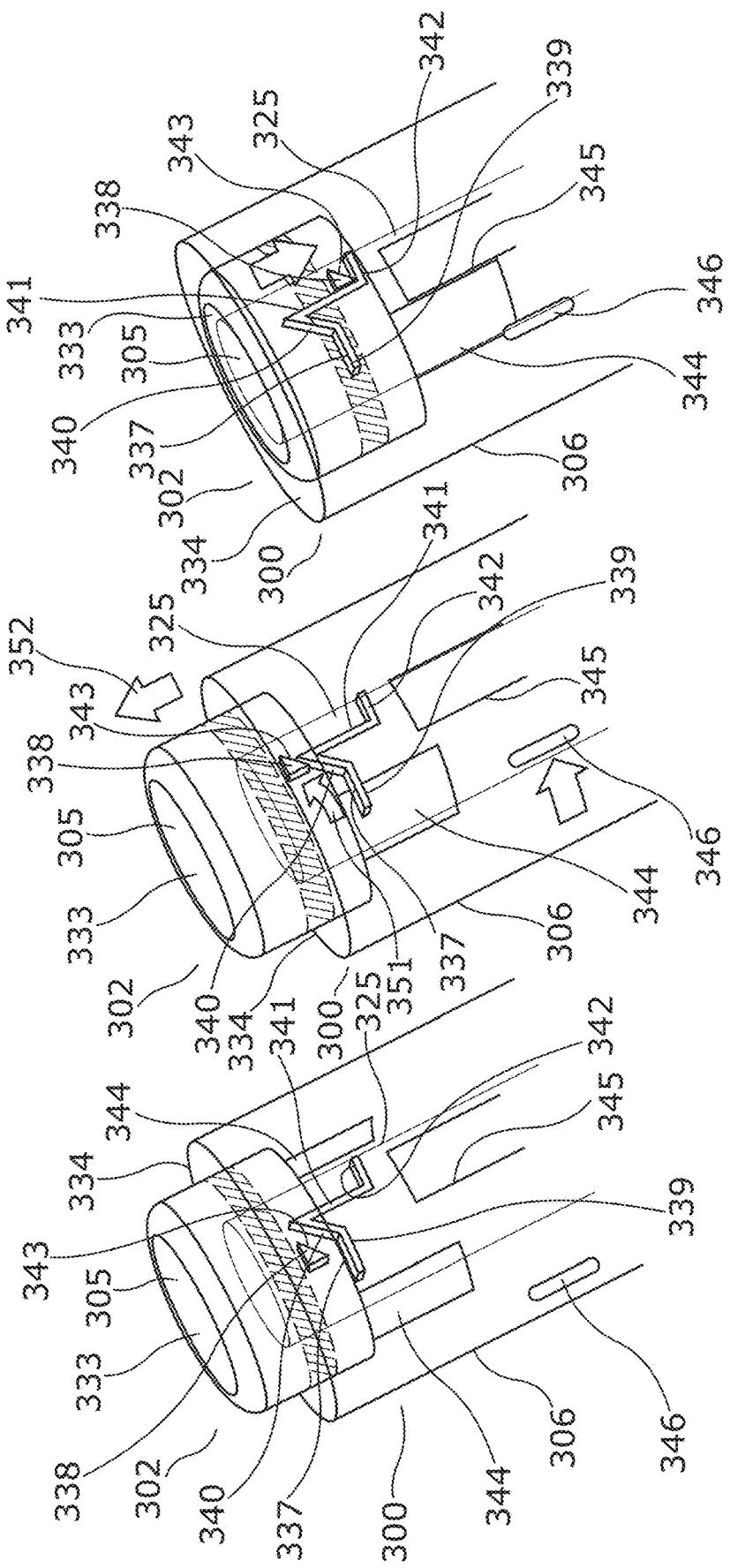

MEDICAMENT DELIVERY DEVICE

TECHNICAL FIELD

The present disclosure relates to a medicament delivery device.

BACKGROUND

Medicament delivery devices, such as auto-injectors, are known in the art for dispensing medicament to an injection site of a patient. Some medicament delivery devices comprise a button for actuating the device, and a lock ring which may be rotated to unlock the medicament delivery device and allow the button to be pressed to actuate the device. For example, the lock ring may be movable between a first position in which the button is locked in place and is not permitted to move, and a second position in which the button is unlocked and is permitted to move, so that the device may be used. Moving the lock ring from the first position into the second position may cause the device to be moved from a pre-use state into a ready to use state. In some cases, the device may comprise a lock ring indicator, for example a visual indicator, which changes state between the first and second positions of the lock ring, to visually indicate the rotational position of the lock ring, which may hence provide an indication of whether the device is in the pre-use state or the ready to use state. In some cases, the lock ring indicator may not be visible to the user from some viewing angles or directions, and hence may not be visible from every injection position. For example, in some cases, the lock ring indicator may not be visible from the abdomen, if the device is not initially positioned with the lock ring indicator facing vertically, or from the thigh, if the device is not initially positioned with the lock ring indicator facing towards the user, or is viewed from above. Furthermore, in some cases, it may be difficult to ascertain the state of the device from the lock ring indicator regardless of the viewing angle, for example if the user is blind or partially sighted. In some cases, one or more of these issues may lead to: a lack of awareness that the device needs to be unlocked, and therefore an initial attempt to press the button without unlocking the device; a lack of understanding in how the device should be unlocked; and/or a lack of comprehension that the device has been unlocked, if attempted.

SUMMARY

A first aspect of this disclosure provides a medicament delivery device comprising: a proximal end and a distal end defining a longitudinal axis; a body; a button arranged at the proximal end and configured to actuate the medicament delivery device; a lock ring configured to rotate relative to the body about the longitudinal axis between a first position in which the button is not permitted to move along the longitudinal axis relative to the body, and a second position in which the button is permitted to move along the longitudinal axis relative to the body; a plurality of first indication elements circumferentially spaced around a first portion of the medicament delivery device; and a plurality of second indication elements circumferentially spaced around a second portion of the medicament delivery device; wherein the plurality of first indication elements and the plurality of second indication elements are moveable relative to one another between a first state in which at least one of the plurality of first indication elements is not circumferentially aligned with at least one of the plurality of second indication elements, and a second state in which said at least one of the plurality of first indication elements is circumferentially aligned with said at least one of the plurality of second indication elements; wherein when the lock ring is in the first position the plurality of first and second indication elements are in the first state, and when the lock ring is in the second position the plurality of first and second indication elements are in the second state.

In some embodiments, the plurality of first indication elements are circumferentially patterned around the first portion of the medicament delivery device, and/or the plurality of second indication elements are circumferentially patterned around the second portion of the medicament delivery device.

In some embodiments, the first portion of the medicament delivery device is rotatable relative to the second portion of the medicament delivery device.

In some embodiments, the body is generally cylindrical. In some embodiments, the body comprises a proximal end that is arranged proximal to the proximal end of the medicament delivery device, and the body comprises a distal end that is arranged proximal to the distal end of the medicament delivery device. In some embodiments, the lock ring is generally cylindrical. In some embodiments, the lock ring is generally hollow. In some embodiments, the button is generally cylindrical.

In some embodiments, the lock ring and the body are arranged along the longitudinal axis such that the lock ring is arranged relatively closer to the proximal end and the body is arranged relatively closer to the distal end of the medicament delivery device.

In some embodiments, the lock ring is configured to circumscribe at least a portion of the button. In some embodiments, the lock ring is configured to receive at least a portion of the button.

In some embodiments, the lock ring comprises a protruding element configured to be arranged to block longitudinal movement of the button when the lock ring is in the first position, and arranged to not block longitudinal movement of the button when the lock ring is in the second position. In some embodiments, the protruding element comprises a radially projecting element, such that rotating the lock ring from the first position to the second position moves the radially projecting element from a first position in which the radially projecting element prevents movement of the button along the longitudinal axis relative to the body, into a second position in which the radially projecting element does not prevent movement of the button along the longitudinal axis relative to the body. In some embodiments, the radially projecting element extends along a radial direction that is generally normal to the longitudinal axis.

In some embodiments, the plurality of first indication elements and the plurality of second indication elements are configured to be moveable relative to one another between the first and second states along a circumferential direction that is generally normal to and circumscribes the longitudinal axis. In some embodiments, the plurality of first indication elements and the plurality of second indication elements are configured to be rotated relative to one another about the longitudinal axis to move between the first and second states. In some embodiments, the plurality of first indication elements are configured to be moveable relative to the plurality of second indication elements. In some embodiments, the plurality of second indication elements are configured to remain stationary relative to the body, and the plurality of first indication elements are configured to be moved relative to the plurality of first indication elements to move the plurality of first indication elements and the plurality of second indication elements between the first and second states.

In some embodiments, moving the lock ring from the first position into the second position causes the plurality of first indication elements and the plurality of second indication elements to be moved from the first state into the second state. In some embodiments, moving the lock ring from the first position into the second position causes the plurality of first indication elements to move relative to the plurality of second indication elements.

In some embodiments, the first portion of the medicament delivery device is spaced apart from the second portion of the medicament delivery device along the longitudinal axis.

In some embodiments, the first portion of the medicament delivery device is arranged to overlap with the second portion of the medicament delivery device along the longitudinal axis.

In some embodiments, the first and second portions of the medicament delivery device are arranged to be concentric with one another. In some embodiments, the first portion of the medicament delivery device is arranged to circumscribe the second portion of the medicament delivery device, or the second portion of the medicament delivery device is arranged to circumscribe the first portion of the medicament delivery device.

In some embodiments, each of the plurality of first indication elements is configured to be circumferentially alignable with a respective one of the plurality of second indication elements.

In some embodiments, the plurality of first indication elements and the plurality of second indication elements are moveable relative to one another between a first state in which the plurality of first indication elements are not circumferentially aligned with the plurality of second indication elements, and a second state in which the plurality of first indication elements are circumferentially aligned with the plurality of second indication elements.

In some embodiments, the button is coupled to the lock ring such that the button is configured to rotate relative to the body about the longitudinal axis together with the lock ring.

In some embodiments, the first portion comprises at least a portion of the lock ring, such that the plurality of first indication elements are arranged on the lock ring, or the first portion comprises at least a portion of the button, such that the plurality of first indication elements are arranged on the button. In some embodiments, the second portion comprises at least a portion of the body, such that the plurality of second indication elements are arranged on the body. In some embodiments, the lock ring comprises the plurality of first indication elements and the body comprises the plurality of second indication elements.

In some embodiments, the plurality of first indication elements and/or the plurality of second indication elements comprises a visual indicator. In some embodiments, the visual indicator is printed. In some embodiments, the first portion of the medicament delivery device comprises a first pattern comprising the plurality of first indication elements, and the second portion of the medicament delivery device comprises a second pattern comprising the plurality of second indication elements. In some embodiments, the second pattern generally corresponds with the first pattern. In some embodiments, the second pattern is substantially similar or generally identical to the first pattern.

In some embodiments, the plurality of first indication elements are circumferentially spaced apart from one another around the first portion of the medicament delivery device by a first spacing, and the plurality of second indication elements are circumferentially spaced apart from one another around the second portion of the medicament delivery device by a second spacing, wherein the first spacing is equal to the second spacing.

In some embodiments, along a circumferential direction of the medicament delivery device that is generally normal to and circumscribes the longitudinal axis, each of the plurality of first indication elements comprises a first width, and each of the plurality of second indication elements comprises a second width, wherein the first width is approximately equal to the second width.

In some embodiments, the first portion comprises a first color, and the plurality of first indication elements each comprises a second color that is different to the first color.

In some embodiments, the second portion further comprises a plurality of third indication elements, wherein when the plurality of first and second indication elements are in the first state, at least one of the plurality of first indication elements is circumferentially aligned with at least one of the plurality of third indication elements, and when the plurality of first and second indication elements are in the second state, said at least one of the plurality of first indication elements is not circumferentially aligned with said at least one of the plurality of third indication elements.

In some embodiments, each of the plurality of second indication elements is a third color and each of the plurality of third indication elements is a fourth color, wherein the fourth color is different to the third color. In some embodiments, the third color is the same as the second color. In some embodiments, when the plurality of first and second indication elements are in the first state, the plurality of first indication elements are circumferentially aligned with the plurality of third indication elements, and when the plurality of first and second indication elements are in the second state, the plurality of first indication elements are not circumferentially aligned with the plurality of third indication elements.

In some embodiments, the medicament delivery device comprises a first label coupled to the first portion of the medicament delivery device, for example via an adhesive layer, and a second label coupled to the second portion of the medicament delivery device, for example via an adhesive layer, wherein the first label comprises the plurality of first indication elements, and the second label comprises the plurality of second indication elements. In some embodiments, the plurality of first indication elements are printed on the first label, and the plurality of second indication elements are printed on the second label.

In some embodiments, the medicament delivery device further comprises a label comprising: a first label portion coupled to the first portion of the medicament delivery device via an adhesive layer and comprising the plurality of first indication elements, a second label portion coupled to the second portion of the medicament delivery device via an adhesive layer and comprising the plurality of second indication elements, and a tear line arranged between the first and second label portions, wherein moving the lock ring from the first position into the second position causes the label to tear along the tear line. In some embodiments, the plurality of first indication elements are printed on the first label portion, and the plurality of second indication elements are printed on the second label portion. In some embodiments, when the first label portion is coupled to the second label portion, the plurality of first and second indication elements are in the first state, and when the label has been torn along the tear line such that the first and second label portions are separated from one another, the plurality of first and second indication elements are in the second state.

In some embodiments, the plurality of first indication elements comprises a visual indicator and the plurality of second indication elements comprises a tactile indicator. In some embodiments, the plurality of first indication elements comprises a tactile indicator and the plurality of second indication elements comprises a visual indicator.

In some embodiments, the plurality of first indication elements and/or the plurality of second indication elements comprises a tactile indicator. In some embodiments, the tactile indicator comprises a portion that protrudes from and/or comprises a different surface texture to the remainder of the first or second portion respectively.

In some embodiments, each of the plurality of first indication elements comprises a first protruding portion arranged to protrude from the first portion of the medicament delivery device, and each of the plurality of second indication elements comprises a second protruding portion arranged to protrude from the second portion of the medicament delivery device. In some embodiments, each of the plurality of first indication elements comprises a first protruding portion arranged to protrude from a main body of the lock ring, and each of the plurality of second indication elements comprises a second protruding portion arranged to protrude from the body of the medicament delivery device. In some embodiments, each of the first and second protruding portions may comprise a generally triangular or generally rectangular cross-sectional profile. In some embodiments, each of the first and second protruding portions may be generally tapered. In some embodiments, each of the first protruding portions is configured to interface with a respective one of the second protruding portions, to form a combined protruding portion. In some embodiments, each of the first and second protruding portions is arranged to protrude radially outwards away from the longitudinal axis.

In some embodiments, the lock ring comprises a plurality of protruding portions, wherein the plurality of first indication elements comprises the protruding portions of the lock ring. In some embodiments, the protruding portions are equally spaced apart around the lock ring. In some embodiments, the lock ring comprises two or more protruding portions, for example three, four, five, six, seven, eight or more protruding portions.

In some embodiments, the body comprises a plurality of protruding portions, wherein the plurality of second indication elements comprises the protruding portions of the body. In some embodiments, the protruding portions are equally spaced apart around the body. In some embodiments, the body comprises two or more protruding portions, for example three, four, five, six, seven, eight or more protruding portions.

In some embodiments, the second portion of the medicament delivery device comprises an indicator ring, wherein the indicator ring and the first portion of the medicament delivery device are rotatable relative to one another, wherein the indicator ring comprises the second indication elements which are circumferentially spaced apart around the indicator ring and are separated by a plurality of masking portions configured to mask the first indication elements, such that: when the plurality of first and second indication elements are in the first state, each of the plurality of first indication elements is aligned with a respective one of the plurality of masking portions, such that the plurality of first indication elements are not visible; and when the plurality of first and second indication elements are in the second state, each of the plurality of first indication elements is not aligned with a respective one of the plurality of masking portions, such that the plurality of first indication elements are visible. In some embodiments, each of the second indication elements comprises a cut-out, gap, aperture, transparent portion or translucent portion of the indicator ring, and each of the masking portions comprises a solid and/or opaque portion of the indicator ring. In some embodiments, the indicator ring is configured to circumscribe the first portion of the medicament delivery device. In some embodiments, the button or the lock ring comprises the indicator ring. In some embodiments, a spring guide of the medicament delivery device comprises the indicator ring.

In some embodiments, the plurality of first indication elements each comprises a first shape and are circumferentially spaced apart around the first portion separated by a plurality of spacing portions also comprising the first shape, to form a first circumferential pattern of alternating first indication elements and spacing portions; and the plurality of second indication elements and the plurality of masking portions also comprise the first shape and form a second circumferential pattern of alternating second indication elements and masking portions, such that the second circumferential pattern corresponds with the first circumferential pattern.

In some embodiments, the medicament delivery device further comprises an indicator ring, wherein: the lock ring is configured to rotate relative to the indicator ring; the first indication elements are arranged on the button or the lock ring; and wherein the indicator ring comprises the second indication elements which are circumferentially spaced apart around the indicator ring and are separated by a plurality of masking portions configured to mask the first indication elements; such that: when the plurality of first and second indication elements are in the first state, each of the plurality of first indication elements is aligned with a respective one of the plurality of masking portions, such that the plurality of first indication elements are not visible; and when the plurality of first and second indication elements are in the second state, each of the plurality of first indication elements is not aligned with a respective one of the plurality of masking portions, such that the plurality of first indication elements are visible. In some embodiments, the indicator ring is generally annular. In some embodiments, each of the second indication elements comprises a cut-out, gap, aperture, transparent portion or translucent portion of the indicator ring, and each of the masking portions comprises a solid and/or opaque portion of the indicator ring. In some embodiments, the plurality of first indication elements are arranged on an indicator portion of the button or the lock ring and the indicator ring is configured to circumscribe the indicator portion. In some embodiments, the plurality of first indication elements are arranged on an indicator portion of the button that is arranged to protrude from the lock ring, and the indicator ring is configured to circumscribe the indicator portion. In some embodiments, the lock ring and the button are configured to be rotated relative to the indicator ring to move the plurality of first and second indication elements from the first state into the second state.

In some embodiments, the plurality of first indication elements each comprises a first shape and are circumferentially spaced apart around the first portion separated by a plurality of spacing portions also comprising the first shape, to form a first circumferential pattern of alternating first indication elements and spacing portions; and wherein the plurality of second indication elements and the plurality of masking portions also comprise the first shape and form a second circumferential pattern of alternating second indication elements and masking portions, such that the second circumferential pattern corresponds with the first circumferential pattern.

In some embodiments, the plurality of first indication elements each comprise a first shape and are circumferentially spaced apart from one another around the first portion of the medicament delivery device by a first spacing, and the plurality of second indication elements each comprise a second shape and are circumferentially spaced apart from one another around the second portion of the medicament delivery device by a second spacing, wherein the second shape is the same as the first shape and the second spacing is equal to the first spacing. In some embodiments, the plurality of first indication elements are separated from one another circumferentially around the longitudinal axis by a plurality of spacing portions, wherein each of the spacing portions also comprises the first shape; and the plurality of masking portions also comprise the first shape. In some embodiments, the plurality of first indication elements and the plurality of second indication elements each comprise a generally rectangular, square, triangular, arrow shaped or chevron shaped shape. In some embodiments, the plurality of masking portions each comprise a generally rectangular, square, triangular, arrow shaped or chevron shaped shape.

In some embodiments, the button or the lock ring comprises an indicator ring which comprises the first portion of the medicament delivery device, and is configured to rotate relative to the second portion of the medicament delivery device. In some embodiments, the indicator ring is configured to circumscribe the second portion of the medicament delivery device. In some embodiments, the indicator ring comprises the plurality of first indication elements, which are circumferentially spaced apart around the indicator ring by a plurality of masking portions configured to mask the plurality of second indication elements. In some embodiments, the plurality of second indication elements are spaced apart around the second portion of the medicament delivery device and are separated by a plurality of spacing elements. In some embodiments, when the plurality of first and second indication elements are in the first state, each of the plurality of second indication elements is aligned with a respective one of the plurality of masking portions, such that the plurality of second indication elements are not visible. In some embodiments, when the plurality of first and second indication elements are in the second state, each of the plurality of second indication elements is not aligned with a respective one of the plurality of masking portions, such that the plurality of second indication elements are visible. In some embodiments, each of the plurality of first indication elements comprises a cut-out, gap, aperture, transparent portion or translucent portion of the indicator ring, and each of the masking portions comprises a solid and/or opaque portion of the indicator ring. In some embodiments, the body of the medicament delivery device or a spring guide of the medicament delivery device comprises the second portion of the medicament delivery device. In some embodiments, the plurality of first indication elements each comprises a first shape and are circumferentially spaced apart around the indicator ring separated by a plurality of masking portions also comprising the first shape, to form a first circumferential pattern of alternating first indication elements and masking portions; and the plurality of second indication elements and the plurality of spacing portions also comprise the first shape and form a second circumferential pattern of alternating second indication elements and spacing portions, such that the second circumferential pattern generally corresponds with the first circumferential pattern.

In some embodiments, the button is arrangeable in an extended position in which a proximal portion of the button is arranged to protrude from the lock ring, and a retracted position in which the proximal portion of the button is arranged inside the lock ring. In some embodiments, the button is arrangeable in an intermediate position between the extended position and the retracted position.

In some embodiments, the button is arrangeable in an extended position in which a proximal portion of the button is arranged to protrude from the lock ring, and a retracted position in which the proximal portion of the button is arranged inside the lock ring; wherein when the lock ring is in the first position the button is arranged in the extended position, and when the lock ring is in the second position the button is permitted to move along the longitudinal axis in a distal direction towards the distal end towards the retracted position; and wherein the medicament delivery device further comprises: a spring configured to bias the button towards the extended position; and a spring guide configured to house and/or constrain the spring; wherein the spring guide comprises the indicator ring, and a main body configured to be received inside the lock ring, wherein the indicator ring is arranged to protrude from the main body and to circumscribe at least a portion of the button and/or the lock ring. In some embodiments, the plurality of first indication elements are arranged on an indicator portion of the button or the lock ring and the indicator ring is configured to circumscribe the indicator portion.

In some embodiments, the main body of the spring guide is generally cylindrical, and the spring guide further comprises a plurality of radially outwardly extending connecting portions, which connect the main body to the indicator ring. In some embodiments, the spring is arranged inside the spring guide, for example inside the main body thereof. In some embodiments, the spring guide is arranged to circumscribe at least a portion of the spring.

In some embodiments, the button comprises one or more protruding arms, for example one or more circumferentially equally spaced arms which protrude generally along the longitudinal direction, i.e. generally parallel to the longitudinal axis. In some embodiments, the one or more protruding arms are configured to rotationally contact, engage with and/or abut with the connecting portions of the spring guide, in order to limit the circumferential range of motion of the lock ring and the button together relative to the body.

In some embodiments, the indicator ring is arranged to overlap with at least a portion of the button along the longitudinal axis.

In some embodiments, the button is moveable relative to the body along the longitudinal axis in: a proximal direction in which the button is moved away from the distal end and towards the proximal end, and in a distal direction in which the button is moved away from the proximal end and towards the distal end. In some embodiments, when the lock ring is in the first position the button is not permitted to move along the distal direction, and when the lock ring is in the second position the button is permitted to move along the distal direction. In some embodiments, moving the lock ring from the first position into the second position permits the button to be moved along the distal direction. In some embodiments, moving the button from the extended position into the retracted position comprises moving the button along the distal direction. In some embodiments, moving the lock ring from the first position towards the second position causes the button to move along the proximal direction.

In some embodiments, the button comprises an actuation surface, wherein upon application of a force to the actuation surface, the button is configured to move relative to the body. In some embodiments, upon application of a force to the actuation surface, the button is configured to move from the extended position towards the retracted position. In some embodiments, upon application of a force to the actuation surface, the button is configured to move along the distal direction. In some embodiments, upon application of a force to the actuation surface when the lock ring is in the first position, the button is configured to remain stationary relative to the body along the longitudinal axis, and upon application of a force to the actuation surface when the lock ring is in the second position, the button is caused to move relative to the body along the longitudinal axis.

In some embodiments, the medicament delivery device further comprises a needle for injecting medicament into a user. In some embodiments, the needle is moveable relative to the body from a pre-use position to an injecting position, wherein in the pre-use position a distal end of the needle is arranged within the body, and in the injecting position the distal end of the needle protrudes outside of a distal end of the body for injecting medicament into the user.

In some embodiments, the medicament delivery device further comprises a plunger moveable relative to the body along the longitudinal axis, towards the distal end, from a first position to a second position, wherein movement of the plunger from the first position into the second position causes the needle to move from the pre-use position into the injecting position. In some embodiments, moving the button from the extended position into the retracted position causes the plunger to move from the first position into the second position.

In some embodiments, the medicament delivery device comprises a supplementary first indication element and a supplementary second indication element, wherein the supplementary first and second indication elements are moveable relative to one another between a first state in which the supplementary first indication element is not circumferentially aligned with the supplementary second indication element, and a second state in which the supplementary first indication element is circumferentially aligned with the supplementary second indication element. In some embodiments, when the lock ring is in the first position the supplementary first and second indication elements are in the first state, and when the lock ring is in the second position the supplementary first and second indication elements are in the second state. In some embodiments, the medicament delivery device comprises a supplementary third indication element, wherein when the supplementary first and second indication elements are in the first state, the supplementary first indication element is circumferentially aligned with the supplementary third indication element, and when the supplementary first and second indication elements are in the second state, the supplementary first indication element is not circumferentially aligned with the supplementary third indication element. In some embodiments, the lock ring comprises the supplementary first indication element, and the body comprises the supplementary second indication element. In some embodiments, the body comprises the supplementary third indication element.

In some embodiments, the medicament delivery device contains a medicament.

In some embodiments, the medicament delivery device according to the first aspect of this disclosure comprises one or more features of the medicament delivery device described below in relation to the second aspect of this disclosure, such as one or more optional features thereof.

A second aspect of this disclosure provides a medicament delivery device comprising a proximal end and a distal end defining a longitudinal axis; a body; a button arranged at the proximal end and configured to actuate the medicament delivery device; and a lock ring configured to rotate relative to the body about the longitudinal axis between a first position in which the button is not permitted to move along the longitudinal axis relative to the body, and a second position in which the button is permitted to move along the longitudinal axis relative to the body; wherein movement of the lock ring from the first position towards the second position causes the button to move along the longitudinal axis relative to the body.

In some embodiments, the medicament delivery device according to the second aspect of this disclosure comprises one or more features of the medicament delivery device described above in relation to the first aspect of this disclosure, such as one or more optional features thereof.

In some embodiments, the button is coupled to the lock ring such that rotating the lock ring relative to the body about the longitudinal axis causes the button to rotate relative to the body about the longitudinal axis.

In some embodiments rotating the lock ring relative to the body about the longitudinal axis causes the button to move along the longitudinal axis.

In some embodiments, when the lock ring is in the first position the button is not depressible, and when the lock ring is in the second position the button is depressible. In some embodiments, moving the lock ring from the first position into the second position causes the button to be configured to be depressible.

In some embodiments, the button is arrangeable relative to the body along the longitudinal axis in two or more axial positions. In some embodiments, the button is arrangeable relative to the body along the longitudinal axis in three axial positions. In some embodiments, when the lock ring is in the first position, the button is configured to be arranged in a first axial position, and when the lock ring is in the second position, the button is configured to be moveable from a second axial position to a third axial position. In some embodiments, the second and third axial positions are different to the first axial position and to one another.

In some embodiments, the button is coupled to the lock ring such that the button is configured to rotate relative to the body about the longitudinal axis together with the lock ring.

In some embodiments, rotation of the lock ring from the first position towards the second position causes the button to move along the longitudinal axis relative to the body in a proximal direction away from the distal end, and movement of the lock ring into the second position permits the button to be moveable along the longitudinal axis relative to the body in a distal direction towards the distal end.

In some embodiments, movement of the lock ring from the first position into the second position causes the button to move along the longitudinal axis relative to the body. In some embodiments, movement of the lock ring from the first position into the second position causes the button to move along the longitudinal axis relative to the body in a proximal direction away from the distal end.

In some embodiments, when the lock ring is in the second position, the button is permitted to be moveable along the longitudinal axis relative to the body in a distal direction towards the distal end.

In some embodiments, the button comprises an actuation surface, wherein application of an actuation force to the actuation surface causes the button to move along the longitudinal axis towards the distal end.

In some embodiments, the button is biased towards the proximal end by a biasing means, such as a spring. In some embodiments, the button is biased away from the distal end by a biasing means, such as a spring.

In some embodiments, rotating the button relative to the body about the longitudinal axis causes the button to move along the longitudinal axis relative to the body.

In some embodiments, the button is moveable relative to the body along the longitudinal axis in: a proximal direction towards the proximal end and away from the distal end, and a distal direction towards the distal end and away from the proximal end. In some embodiments, movement of the lock ring from the first position towards the second position causes the button to move along the proximal direction. In some embodiments, when the lock ring is in the second position, the button is permitted to move along the distal direction, and when the lock ring is in the first position, the button is not permitted to move along the distal direction.

In some embodiments, the button is moveable relative to the body along the longitudinal axis between an extended position in which a proximal portion of the button and a distal portion of the button are arranged to protrude from the lock ring, and a retracted position in which the proximal and distal portions of the button are arranged inside the lock ring. In some embodiments, the lock ring comprises a proximal end surface, and when the button is in the retracted position, the actuation surface of the button is configured to be generally flush with the proximal end surface of the lock ring.

In some embodiments, the button is arrangeable in an intermediate position between the extended position and the retracted position, wherein when the button is in the intermediate position, the proximal portion of the button is arranged to protrude from the lock ring, and the distal portion of the button is arranged inside the lock ring. In some embodiments, when the button is in the extended position or the intermediate position, the actuation surface of the button is configured to be spaced apart from the proximal end surface of the lock ring along the longitudinal axis.

In some embodiments, when the lock ring is in the first position, the button is configured to be in the retracted position or in the intermediate position.

In some embodiments, movement of the lock ring from the first position towards the second position causes the button to move towards the extended position.

In some embodiments, movement of the lock ring from the first position towards the second position causes the button to move into the extended position.

In some embodiments, upon the lock ring reaching the second position, the button is configured to be movable into the retracted position or into the intermediate position.

In some embodiments, when the lock ring is in the first position, the button is configured to be in the intermediate position, wherein moving the lock ring from the first position towards the second position causes the button to move from the intermediate position into the extended position, and wherein upon the lock ring reaching the second position, the button is configured to be movable into the retracted position.

In some embodiments, when the lock ring is in the first position, the button is configured to be in the intermediate position, and moving the lock ring from the first position towards the second position causes the button to move from the intermediate position into the extended position, and wherein upon the lock ring reaching the second position, the button is configured to be moveable into the intermediate position.

In some embodiments, when the lock ring is in the first position, the button is configured to be in the retracted position, and moving the lock ring from the first position towards the second position causes the button to move from the retracted position into the extended position, and wherein upon the lock ring reaching the second position, the button is configured to be moveable into the retracted position.

In some embodiments, when the lock ring is in the first position, the button is configured to be in the retracted position, wherein moving the lock ring from the first position towards the second position causes the button to move from the retracted position into the extended position, and wherein upon the lock ring reaching the second position, the button is configured to be moveable into the intermediate position.

In some embodiments, the proximal portion of the button comprises a first visual indicator, and the distal portion of the button comprises a second visual indicator that is different to the first visual indicator, for example wherein the first visual indicator comprises a first color, a first pattern, and/or a first surface decoration, and wherein the second visual indicator comprises a second color, a second pattern, and/or a second surface decoration that is different to the first color, the first pattern, and/or the first surface decoration respectively. In some embodiments, the proximal portion of the button comprises a first color and the distal portion of the button comprises a second color that is different to the first color.

In some embodiments, the medicament delivery device further comprises a spring configured to bias the button away from the distal end, and a spring guide configured to house and/or constrain the spring, wherein the spring guide is coupled to the body such that when the lock ring and the button rotate relative to the body about the longitudinal axis, the button is caused to rotate relative to the spring guide about the longitudinal axis. In some embodiments, the spring is a compression spring. In some embodiments, at least a portion of the spring guide is configured to be arranged inside the lock ring. In some embodiments, the spring guide is generally cylindrical.

In some embodiments, the medicament delivery device further comprises a spring configured to bias the button towards the extended position, and a spring guide configured to house and/or constrain the spring, wherein the spring guide is coupled to the body such that when the lock ring and the button rotate relative to the body about the longitudinal axis, the button is caused to rotate relative to the spring guide about the longitudinal axis. In some embodiments, the spring is a compression spring. In some embodiments, at least a portion of the spring guide is configured to be arranged inside the lock ring. In some embodiments, the spring guide is generally cylindrical.

In some embodiments, the spring guide comprises an engagement surface and the button comprises an engagement element arranged inside the lock ring and configured to move relative to the engagement surface, such that when the button is rotated relative to the spring guide about the longitudinal axis, the engagement element is caused to move along the engagement surface and to be guided thereby. In some embodiments, the engagement surface is configured to provide for mechanical conversion of rotational movement of the lock ring into longitudinal movement of the button.

In some embodiments, the medicament delivery device comprises a circumferential direction that circumscribes the longitudinal axis. In some embodiments, the medicament delivery device comprises a circumferential plane that is arranged to circumscribe the longitudinal axis. In some embodiments, the engagement surface is arranged in the circumferential plane. In some embodiments, the engagement surface is arranged to be generally parallel to the circumferential plane. In some embodiments, the engagement surface extends generally along the circumferential direction.

In some embodiments, rotation of the button relative to the spring guide about the longitudinal axis causes the engagement element to move relative to the engagement surface in the circumferential plane.

In some embodiments, the engagement surface comprises an angled surface that is angled relative to the longitudinal axis and relative to a circumferential direction about the longitudinal axis, wherein movement of the engagement element along the angled surface causes the button to move relative to the body along the longitudinal axis. In some embodiments, the angled surface is generally inclined or diagonal in the circumferential plane.

In some embodiments, the engagement element comprises a block, a wedge, or a roller. In some embodiments, the engagement element comprises an angled surface configured to engage with the engagement surface. In some embodiments, the engagement element is integrally formed with the button. In some embodiments, the button comprises a distal portion configured to be received in and arranged inside the lock ring, wherein the distal portion comprises the engagement element.

In some embodiments, the engagement surface comprises a first portion that extends generally along a circumferential direction about the longitudinal axis, a second portion that is generally angled relative to the circumferential direction and the longitudinal axis, a third portion that is generally parallel to the longitudinal axis and is generally normal to the first portion, and a fourth portion that is generally parallel to the first portion and extends generally along the circumferential direction, wherein the second portion is arranged between the first and third portions, and the third portion is arranged between the second and fourth portions. In some embodiments, the first, second, third and/or fourth portions are generally linear. In some embodiments, at least one of the first, second, third or fourth portions is curved.

In some embodiments, movement of the engagement element along the second portion of the engagement surface causes the button to move along the longitudinal axis relative to the body. In some embodiments, movement of the engagement element along the second portion of the engagement surface causes the button to move along the longitudinal axis relative to the body along a proximal direction that is away from the distal end and towards the proximal end.

In some embodiments, the fourth portion is configured to block or otherwise prevent the button from moving along the longitudinal axis.

In some embodiments, the engagement surface comprises a first portion, a second portion, a third portion, and a fourth portion. In some embodiments, the second portion is arranged between the first portion and the third portion. In some embodiments, the third portion is arranged between the second portion and the fourth portion. In some embodiments, the first, second, third and fourth portions are arranged to extend in the circumferential plane. In some embodiments, the first, second, third and fourth portions are arranged to extend generally along the circumferential direction. In some embodiments, the first and fourth portions are arranged to be generally parallel to the circumferential direction.

In some embodiments, the first and fourth portions are arranged to be spaced apart from one another along the longitudinal axis.

In some embodiments, the first and fourth portions are arranged to be generally coincident with one another along the longitudinal axis.

In some embodiments, the third portion is arranged to be generally parallel to the longitudinal axis. In some embodiments, the third portion is arranged to be generally perpendicular to the first and fourth portions.

In some embodiments, the second portion is arranged to be angled relative to the first and/or second portions. In some embodiments, the second portion is arranged to be generally diagonal in the circumferential plane.

In some embodiments, relative to the longitudinal axis, the third portion has a different length to the second portion, such that the first portion and the fourth portion are spaced apart from one another along the longitudinal axis such that they are staggered relative to one another. In some embodiments, the third portion is longer than the second portion, such that the first portion is arranged to be relatively closer to the proximal end and the fourth portion is arranged to be relatively closer to the distal end. In some embodiments, the third portion is shorter than the second portion, such that the first portion is arranged to be relatively closer to the distal end and the fourth portion is arranged to be relatively closer to the proximal end.

In some embodiments, relative to the longitudinal axis, the third portion has approximately the same length as the second portion, such that the first and fourth portions are not spaced apart from one another along the longitudinal axis.

In some embodiments, the button comprises one or more protruding arms arranged to extend generally parallel to the longitudinal axis towards the distal end, wherein the one or more protruding arms are spaced apart from one another about the longitudinal axis and are each configured to engage with a respective one of one or more corresponding blocking elements of the spring guide and/or of the lock ring, in order to limit the rotational range of motion of the button relative to the body.

In some embodiments, the button comprises a plurality of protruding arms arranged to extend generally parallel to the longitudinal axis towards the distal end. In some embodiments, the spring guide comprises one or more circumferential blocking elements. In some embodiments, each of the one or more circumferential blocking elements comprises a recess, groove, channel, aperture, cut-out or protrusion. In some embodiments, each of the protruding arms is configured to deflect into or relative to a corresponding one of the circumferential blocking elements. In some embodiments, each of the one or more circumferential blocking elements is configured to receive a respective one of the protruding arms to prevent the button from moving along the longitudinal axis in a proximal direction away from the distal end and towards the proximal end. In some embodiments, the lock ring comprises one or more longitudinal blocking elements each arranged to be generally parallel to the longitudinal axis.

In some embodiments, when the lock ring is in the first position, the button is configured to be in a first axial position along the longitudinal axis. In some embodiments, when the lock ring is moved from the first position into the second position, the button is caused to be moved from the first axial position into a second axial position along the longitudinal axis. In some embodiments, moving the button from the first axial position into the second axial position comprises moving the button relative to the body along the longitudinal direction in a proximal direction that is away from the distal end and towards the proximal end. In some embodiments, when the lock ring is in the second position, the button is configured to be moveable from the second axial position into a third axial position along the longitudinal axis. In some embodiments, when the lock ring is in the first position, the button is prevented from being moved into the third axial position, and when the lock ring is in the second position the button is permitted to be moved into the third axial position. In some embodiments, moving the button from the second axial position into the third axial position comprises moving the button relative to the body along the longitudinal direction in a distal direction that is away from the proximal end and towards the distal end. In some embodiments, the third axial position is the same as the first axial position. In some embodiments, the third axial position is different to the first axial position. In some embodiments, the third axial position is arranged to be relatively closer to the distal end compared with the first axial position. In some embodiments, the third axial position is arranged to be relatively closer to the proximal end compared with the first axial position.

In some embodiments, the medicament delivery device contains a medicament.

According to another aspect of the present disclosure, there is provided a method of manufacturing or assembling a medicament delivery device, wherein the medicament delivery device is defined in claim 1. Further optional features of the medicament delivery device are described and/or contemplated here.

According to another aspect of the present disclosure, there is provided a method of manufacturing or assembling a medicament delivery device, wherein the medicament delivery device has the features of any of the medicament delivery devices described and/or contemplated herein.

BRIEF DESCRIPTION OF THE DRAWINGS

Embodiments will now be described, by way of example only, with reference to the accompanying drawings, in which:

FIG. 2A is a schematic view of a medicament delivery device prior to use (i.e. in a pre-use configuration);

FIG. 2B is a schematic view of the device of FIG. 2A with the cap removed;

FIG. 2C is a schematic view of the device of FIG. 2A showing the device placed at an injection site;

FIG. 2D is a schematic view of the device of FIG. 2A with the button having been pressed to release the dispensing mechanism;

FIG. 3A shows a medicament delivery device comprising a lock ring in a first position;

FIG. 3B shows a medicament delivery device comprising a lock ring in a second position;

FIG. 4A shows a medicament delivery device comprising a lock ring in a first position;

FIG. 4B shows a medicament delivery device comprising a lock ring in a second position

FIG. 6A shows a medicament delivery device comprising a lock ring in a first position;

FIG. 6B shows a medicament delivery device comprising a lock ring in a second position;

FIG. 7A shows a medicament delivery device comprising a lock ring in a first position;

FIG. 7B shows a medicament delivery device comprising a lock ring in a second position;

FIG. 8 shows an exploded view and a zoomed in detailed cross-sectional view of a medicament delivery device;

FIG. 11A shows a medicament delivery device in a pre-use state comprising a lock ring in a first position;

FIG. 11B shows a medicament delivery device in a ready to use state comprising a lock ring in a second position;

FIG. 11C shows a medicament delivery device in a post-use state comprising a lock ring in a second position;

FIG. 13A shows a medicament delivery device in a pre-use state comprising a lock ring in a first position;

FIG. 13B shows a medicament delivery device in a ready to use state comprising a lock ring in a second position;

FIG. 13C shows a medicament delivery device in a post-use state comprising a lock ring in a second position;

FIG. 14A shows a medicament delivery device in a pre-use state;

FIG. 14B shows a medicament delivery device in a ready to use state;

FIG. 14C shows a medicament delivery device in a post-use state;

DETAILED DESCRIPTION

Figure 1A:
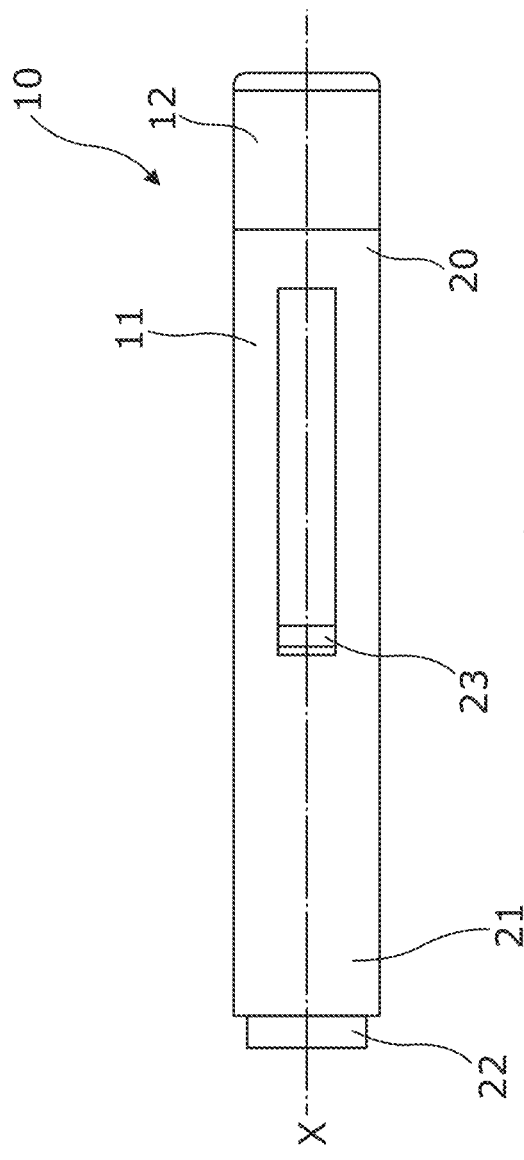
FIG. 1A shows a schematic view of a medicament delivery device with a cap attached.

A drug delivery device (also referred to as an injection device), as described herein, may be configured to inject a medicament into a subject such as a human or animal. For example, delivery could be sub-cutaneous, intra-muscular, or intravenous. Such a device could be operated by a user, who may or may not be the subject. In examples where the user is not the subject, the user may be a care-giver such as a nurse or physician. The device can include various types of safety syringe, pen-injector, or auto-injector. The device can include a cartridge-based system that requires piercing a sealed ampule before use. Volumes of medicament delivered with these various devices can range from about 0.5 ml to about 2 ml. Yet another device can include a large volume device ("LVD") or patch pump, configured to adhere to a subject's skin for a period of time (e.g., about 5, 15, 30, 60, or 120 minutes) to deliver a "large" volume of medicament (typically about 2 ml to about 10 ml).

In combination with a specific medicament, the presently described devices may also be customized in order to operate within required specifications. For example, the device may be customized to inject a medicament within a certain time period (e.g., about 3 to about 20 seconds for auto-injectors, and about 10 minutes to about 60 minutes for an LVD). Other specifications can include a low or minimal level of discomfort, or to certain conditions related to human factors, shelf-life, expiry, biocompatibility, environmental considerations, etc. Such variations can arise due to various factors such as a drug ranging in viscosity from about 3 cP to about 50 cP. Consequently, a drug delivery device will often include a hollow needle ranging from about 25 to about 31 Gauge in size. Common sizes are 27 and 29 Gauge.

The dispensing mechanism provides one or more automated functions. For example, one or more of needle insertion, medicament injection, and needle retraction can be automated. Energy for one or more automation steps can be provided by one or more energy sources. Energy sources can include, for example, mechanical, pneumatic, chemical, or electrical energy. For example, mechanical energy sources can include springs, levers, elastomers, or other mechanical mechanisms to store or release energy. One or more energy sources can be combined into a single device. Devices can further include gears, valves, or other mechanisms to convert energy into movement of one or more components of a device.

The one or more automated functions may each be activated via an activation mechanism. Such an activation mechanism can include one or more of a button, a lever, a needle sleeve, or other activation component. Activation of an automated function may be a one-step or multi-step process. That is, a user may need to activate one or more activation components in order to cause the automated function. For example, in a one-step process, a user may depress a needle sleeve against their body in order to cause injection of a medicament. Other devices may require a multi-step activation of an automated function. For example, a user may be required to depress a button and retract a needle shield in order to cause injection.

In addition, activation of one automated function may activate one or more subsequent automated functions, thereby forming an activation sequence. For example, activation of a first automated function may activate at least two of needle insertion, medicament injection, and needle retraction. Some devices may also require a specific sequence of steps to cause the one or more automated functions to occur. Other devices may operate with a sequence of independent steps.

Some delivery devices can include one or more functions of a safety syringe, pen-injector, or auto-injector. For example, a delivery device could include a mechanical energy source configured to automatically inject a medicament (as typically found in an auto-injector) and a dose setting mechanism (as typically found in a pen-injector).

The medicament delivery device can include various types of safety syringe, pen-injector, or auto-injector. The device can include a cartridge-based system that requires piercing a sealed ampule before use.

Distal movement of the actuation member may cause automatic dispensing of the medicament from the device and/or distal movement of the actuation member may cause the distal movement of the needle from a needle pre-use position to a needle injection position. The dispensing mechanism may be configured to dispense medicament from the needle when the dispensing mechanism is released.

In the needle pre-use position, the needle may be flush with the distal end of the body or the needle may be recessed within the body. In another embodiment, the needle may be fixed in position relative to the body.

In another device, different features may be provided to prevent the actuation member from moving distally. For example, the stop may be provided on another component of the medicament delivery device. In another device, a lock ring 216 is not present.

Figure 1B:
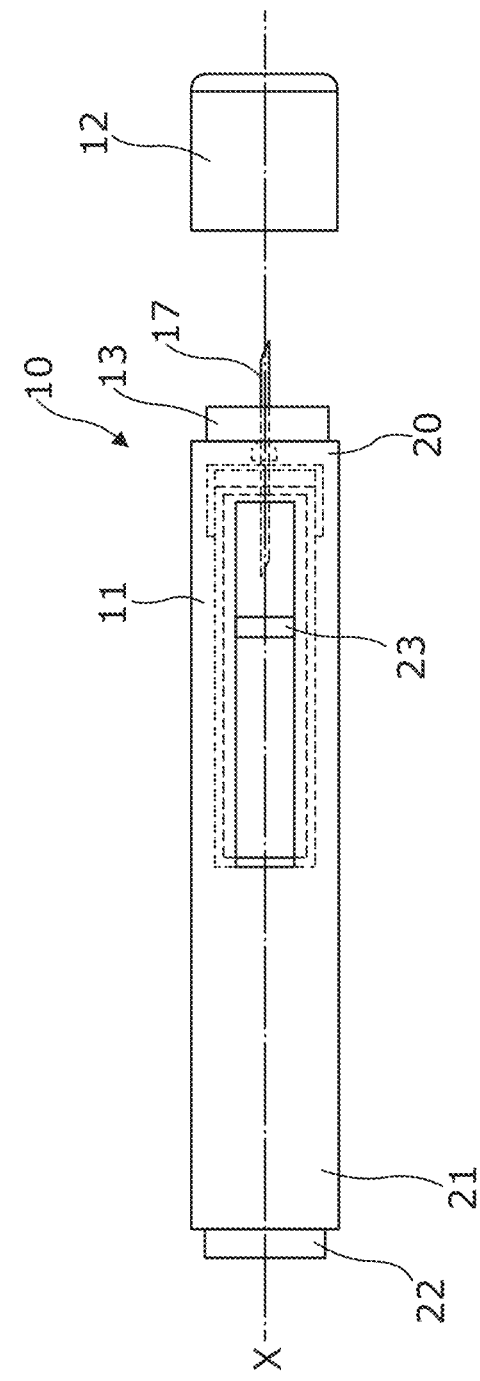
FIG. 1B shows a schematic view of the medicament delivery device of FIG. 1A with the cap removed.

According to some embodiments of the present disclosure, an exemplary drug delivery device 10 is shown in FIGS. 1A & 1B. The device 10, as described above, is configured to inject a medicament into a patient's body. The device 10 includes a housing 11 which typically contains a reservoir containing the medicament to be injected (e.g., a syringe) and the components required to facilitate one or more steps of the delivery process. The device 10 can also include a cap assembly 12 that can be detachably mounted to the housing 11. A user typically removes the cap 12 from the housing 11 before the device 10 is operated. As shown, the housing 11 is substantially cylindrical and has a substantially constant diameter along the longitudinal axis X. The housing 11 has a distal region 20 and a proximal region 21. The term "distal" refers to a location that is relatively closer to a site of injection, and the term "proximal" refers to a location that is relatively further away from the injection site. The device 10 can also include a needle sleeve 13 coupled to the housing 11 to permit movement of the sleeve 13 relative to the housing 11. For example, the sleeve 13 can move in a longitudinal direction parallel to longitudinal axis X. Specifically, movement of the sleeve 13 in a proximal direction can permit a needle 17 to extend from the distal region 20 of the housing 11. Insertion of the needle 17 can occur via several mechanisms. For example, the needle 17 may be fixedly located relative to the housing 11 and initially be located within an extended needle sleeve 13. Proximal movement of sleeve 13 by placing a distal end of the sleeve 13 against a patient's body and moving the housing 11 in a distal direction will uncover the distal end of the needle 17. Such relative movement allows the distal end of the needle 17 to extend into the patient's body. Such insertion is termed "manual" insertion as the needle 17 is manually inserted via the patient's manual movement of the housing 11 relative to the sleeve 13.

Another form of insertion is "automated," whereby the needle 17 moves relative to the housing 11. Such insertion can be triggered by movement of the sleeve 13 or by another form of activation, such as, for example, a button 22. As shown in FIGS. 1A & 1B, the button 22 is located at a proximal end of the housing 11. However, in other embodiments, the button 22 could be located on a side of the housing 11.

Other manual or automated features can include drug injection or needle retraction, or both. Injection is the process by which a bung or piston 23 is moved from a proximal location within a syringe (not shown) to a more distal location within the syringe in order to force a medicament from the syringe through the needle 17. In some embodiments, a drive spring (not shown) is under compression before the device 10 is activated. A proximal end of the drive spring can be fixed within proximal region 21 of the housing 11, and a distal end of the drive spring can be configured to apply a compressive force to a proximal surface of the piston 23. Following activation, at least part of the energy stored in the drive spring can be applied to the proximal surface of the piston 23. This compressive force can act on the piston 23 to move it in a distal direction. Such distal movement acts to compress the liquid medicament within the syringe, forcing it out of the needle 17. Following injection, the needle 17 can be retracted within the sleeve 13 or housing 11. Retraction can occur when the sleeve 13 moves distally as a user removes the device 10 from a patient's body. This can occur as the needle 17 remains fixedly located relative to the housing 11. Once a distal end of the sleeve 13 has moved past a distal end of the needle 17, and the needle 17 is covered, the sleeve 13 can be locked. Such locking can include locking any proximal movement of the sleeve 13 relative to the housing 11.

Another form of needle retraction can occur if the needle 17 is moved relative to the housing 11. Such movement can occur if the syringe within the housing 11 is moved in a proximal direction relative to the housing 11. This proximal movement can be achieved by using a retraction spring (not shown), located in the distal region 20. A compressed retraction spring, when activated, can supply sufficient force to the syringe to move it in a proximal direction. Following sufficient retraction, any relative movement between the needle 17 and the housing 11 can be locked with a locking mechanism. In addition, the button 22 or other components of device 10 can be locked as required.

FIGS. 2A to 2G show the sequential steps of operating a medicament delivery device 200. The medicament delivery device 200 is an autoinjector.

The device 200 comprises a body 201, a syringe 250 having a needle 217 and an axially moveable plunger 223 for dispensing medicament from the syringe 250. The device comprises a cap 254 which is removably attached to the body 201 and covers a distal end 202 of the body 201 for preventing access to the needle 217. The device has a needle shield 266 that covers the needle 217 before use. The needle shield 266 is attached to the cap 254.

The medicament delivery device 200 has a dispensing mechanism 229. The medicament delivery device 200 has an actuation member 227 which is configured to release the dispensing mechanism 229. The actuation member 227 is configured to engage the dispensing mechanism 229 to release the dispensing mechanism 229.

The dispensing mechanism 229 is configured to cause the needle 217 to move distally from a needle pre-use position, in which the needle 217 is recessed within the body 201, to an injection position in which the needle 217 protrudes from the distal end 202 of the body 201 when the dispensing mechanism 229 is released.

The dispensing mechanism 229 is configured to dispense the medicament from the needle 217 when the needle 217 is in the injection position.

As shown in FIGS. 2B-2C, in order to deliver a dose of medicament to an injection site, the cap 254 is removed (FIG. 2B) and the device is placed at an injection site 232 (FIG. 2C).

The actuation member 227 comprises a button 228 and is prevented from being depressed by a stop 258. The stop is provided on the spring guide 240, for example.

The device has a locking member 208 in the form of a lock ring 216 which is rotatable by a user about a longitudinal axis of the device. The actuation member 227 is keyed to the lock ring 216 so that the actuation member 227 rotates with the lock ring 216. The lock ring 216 is rotatable from a pre-use position, in which distal movement of the button 228 is prevented, to a use position in which distal movement of the button 228 is permitted.

When the lock ring 216 is in the pre-use position then the stop 258 engages the button 228 to prevent the button 228 from being depressed.

In order to allow the button 228 to be depressed, the lock ring 216 is rotated about the longitudinal axis of the device from the pre-use position to the use position. The rotation of the lock ring 216 also rotates the actuation member 227 to a position in which the stop 258 no longer prevents the button 228 from being depressed as shown, for example, in FIG. 2C.

Turning now to FIG. 2D, the user then presses the button 228 to release the dispensing mechanism 229 for dispensing medicament from the device. The dispensing mechanism 229 has a plunger 223 and a bias in the form of a compression spring 260. The plunger 223 is biased distally by the spring 260.

The dispensing mechanism 229 is at least partially housed within the spring guide 240. The plunger 223 has a release member which has proximally-extending clips 264. The spring 260 is retained in the compressed position by virtue of the clips 264 which protrude through a proximal opening 265 in the spring guide 240. The clips 264 engage the spring guide 240 for maintaining the plunger 223 in a proximal position.

The actuation member 227 has a firing member comprising a pair of protrusions 242 which engage with the clips 264 when the button 228 is depressed to flex the clips 264 radially inwardly thereby allowing the clips 264 to move distally through the proximal opening 265 to release the spring 260.

When the dispensing mechanism 229 is released, then the syringe 250 is released for distal axial movement towards the injection site 232 such that the needle 217 moves from the needle pre-use retracted position to an exposed (or "uncovered" or "injection") position for delivering medicament to the injection site 232 under the biasing force of the compression spring 260.

Figure 2G:
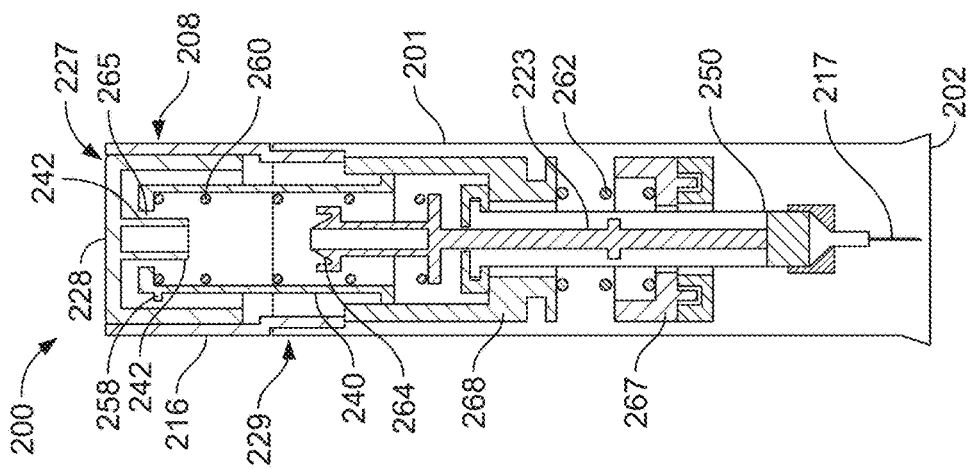
FIG. 2G is a schematic view of the device of FIG. 2A showing the device removed from the injection site after the needle has retracted within the device after delivery of the medicament.
Figure 2F:
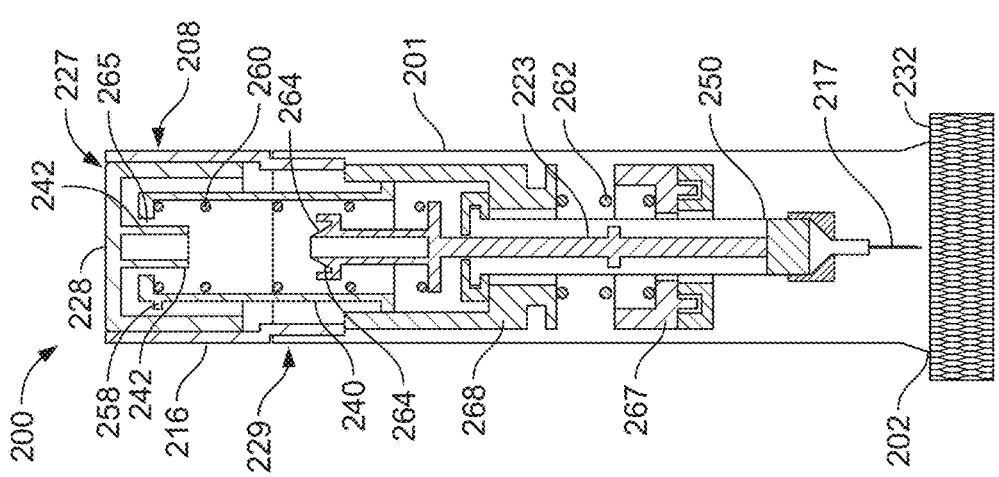
FIG. 2F is a schematic view of the device of FIG. 2A showing the needle having retracted within the device after a dose has been delivered.
Figure 2E:
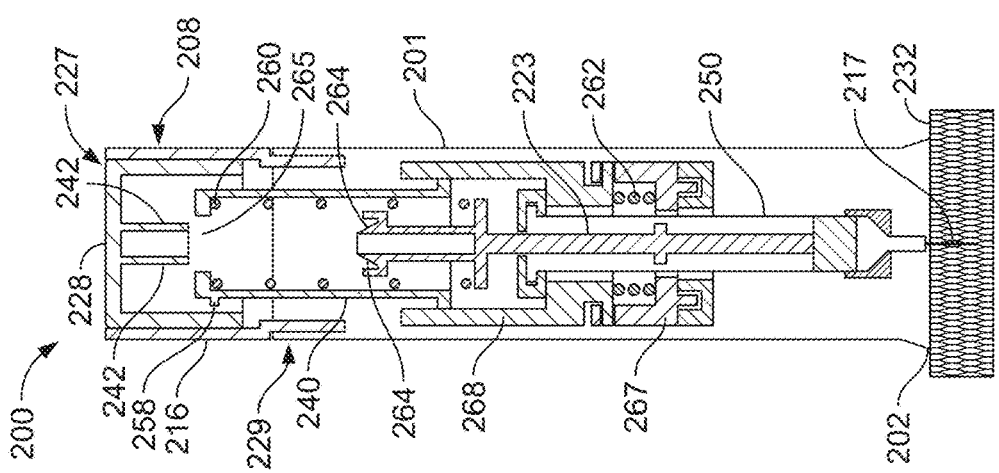
FIG. 2E is a schematic view of the device of FIG. 2A with the button having been pressed to release the dispensing mechanism.

Depressing the button 228 releases the plunger 223 which, biased by the bias 260, moves along the syringe 250 towards the distal end of the device 200 to force medicament within the syringe 250 through the needle 217, thereby delivering a dose of medicament as shown, for example in FIG. 2E.

As shown in FIG. 2F, once the dose of medicament has been delivered, a medicament container bias 262, embodied by a further spring 262, then causes the needle 217 to move axially back to the retracted position, away from the injection site 232 in a proximal direction. The plunger 223 flexes a clip (not shown) on a first collar 267 which allows the first collar 267 to rotate relative to the body 201 and relative to a second collar 268. The first collar 267 rotates from a first position in which the second collar 268 is axially coupled to the first collar 267, into a second position in which the second collar 268 is free to move axially relative to the first collar 267. For example, the second collar 268 may comprise a radially protruding coupling element configured to be received in or engage with a corresponding receiving portion of the first collar 267, such that rotating the first collar 267 from the first position into the second position causes the coupling element to be moved out from the receiving portion, to allow the second collar 268 to move axially relative to the first collar 267. Axial movement of the second collar 268 permits the needle 217 to be retracted.

As shown in FIG. 2G, the device 200 is then removed from the injection site 232, for disposal.

The medicament delivery devices described herein may have some or all of the features as described in relation to the medicament delivery device 200.

The dispensing mechanism 229 may have the some or all of the features as described and/or contemplated in relation to FIGS. 2A to 2G.

In another embodiment, the dispensing mechanism may have alternative or additional features to those described and/or contemplated in relation to FIGS. 2A to 2G. The dispensing mechanism may have features as described and/or contemplated herein, for example in relation to FIGS. 1A and 1B.

FIG. 3A shows a medicament delivery device 300, which may be generally similar to the medicament delivery device 200 described above and shown in FIGS. 1A to 2G. The medicament delivery device comprises a body 301, a button 305 and a lock ring 306, which may be generally similar to the body 201, the button 228, and the lock ring 216 described above in relation to the example shown in FIGS. 2A to 2G. The medicament delivery device 300 comprises a proximal end 302 and a distal end 303 (see FIG. 2A for example), which define a longitudinal direction 304 which extends between the proximal end 302 and the distal end 303 and is parallel to a central longitudinal axis 347 of the medicament delivery device 300. The button 305 is arranged at the proximal end 302 and is configured to actuate the medicament delivery device 300. The lock ring 306 is rotatable relative to the body 301 about the longitudinal axis 347. The lock ring 306 is coupled to the button 305 such that rotation of the lock ring 306 relative to the body 301 about the longitudinal axis 347 causes the button 305 to rotate relative to the body 301 about the longitudinal axis 347 together with the lock ring 306.

The lock ring 306 serves to selectively permit the button 301 from being actuatable and not actuatable, in order to provide a locked state in which the button 301 cannot be depressed relative to the body 301 along the longitudinal direction 304, and an unlocked state in which the button 301 can be depressed relative to the body 301 along the longitudinal direction 304, in order to actuate the medicament delivery device 300 to allow the medicament delivery device 300 to be used. The lock ring 306 is rotatable relative to the body 301 about the longitudinal axis 347 between a first position in which the button 305 is not permitted to move along the longitudinal direction 304 relative to the body 301, for example as shown in FIG. 3A, and a second position in which the button 305 is permitted to move along the longitudinal direction 304 relative to the body 301, for example as shown in FIG. 3B. The lock ring 306 may be configured to function with the button 305 in substantially the same way as the lock ring 216 and the button 228 described above in relation to FIGS. 2A to 2G. As in the above described example, the lock ring 306 may comprise a radially projecting stop 258. In the first position of the lock ring 306 (see FIGS. 2A to 2C for example), the radially projecting stop 258 may prevent the button 305 from being depressed, and the lock ring 306 may then be rotated about the longitudinal axis 347 into the second position (see FIG. 2D for example), to cause the radially projecting stop 258 to no longer obstruct the button 305 from moving along the longitudinal direction 304, thus permitting the button 305 to be depressed by a user. Exemplary ways in which the medicament delivery device 300 can provide a means to facilitate the user's understanding of how to unlock the lock ring 306 and how to identify when the medicament delivery device 300 is locked and unlocked, i.e. when the lock ring 306 is in the first and second positions respectively, and hence whether the medicament delivery device 300 is in a pre-use, ready for use, or post-use sate, shall now be described.

Referring back to FIGS. 3A and 3B, the medicament delivery device 300 differs from the medicament delivery device 200 in that it further comprises a plurality of first indication elements 307 circumferentially spaced around a first portion 309 of the medicament delivery device 300, and a plurality of second indication elements 308 circumferentially spaced around a second portion 310 of the medicament delivery device 300. In the example shown, the lock ring 306 comprises the first portion 309, and the body 301 comprises the second portion 310, such that the plurality of first indication elements 307 are arranged on the lock ring 306 and the plurality of second indication elements 308 are arranged on the body 301. In the example shown, the first portion 309 and the second portion 310 may be referred to as a first longitudinal portion 309 and a second longitudinal portion 310 respectively, since they are arranged relative to one another along the longitudinal direction 304. However, it is envisaged that the first and second portions 309, 310 need not necessarily be longitudinal portions and that they may be separated and arranged relative to one another along any other direction or directions. It is also envisaged that the first and second portions 309, 310 need not necessarily be adjacent to or spaced apart from one another along the longitudinal direction 304 and that they may be at least partially overlapping, for example as shown in the examples of FIGS. 7A, 7B, 8A and 8B as described below.

Turning back to the example shown in FIGS. 3A and 3B, the medicament delivery device 300 further comprises a label 316 comprising a first label portion 317 arranged on the lock ring 306 and affixed thereto via an adhesive layer, and a second label portion 318 arranged on the body 301 and affixed thereto via an adhesive layer. The first and second label portions 317, 318 are joined to one another and are divided from one another by a tear line 319, which may for example comprise a perforated line formed in the label 316. In the example shown, the tear line 319 is oriented to be generally circumferential relative to the central longitudinal axis 347, i.e. to circumscribe the central longitudinal axis 347. The label 316 is thus configured such that tearing or otherwise breaking the label 316 into two pieces along the tear line 319 results in separation of the first and second label portions 317, 318. In the example shown, the first and second indication elements 307, 308 are each in the form of a visual indicator, i.e. an indicator that is visible to the user's eyes, such that they can visually determine the rotational position of the lock ring 306. The first indication elements 307 are printed onto the first label portion 317, and similarly the second indication elements 308 are printed onto the second label portion 318. Whilst in the example shown, the first and second label portions 317, 318 are initially joined to one another and are configured to be torn to separate them along the tear line 319, resulting in their separation, it is also envisaged that the first and second label portions 317, 318 need not necessarily be initially joined along the tear line 319. That is, the medicament delivery device 300 may comprise a first label 317 or a first label portion 317, and a second label 318 or a second label portion 318, which are arranged on the lock ring 306 and the body 301 respectively and which are not initially joined to one another.

Since the label 316 is affixed to both the body 301 and the lock ring 306, with the lock ring 306 being rotatable relative to the body 301 about the longitudinal axis 347, rotating the lock ring 306 from the first position into the second position relative to the body 301 causes the label 316 to tear along the tear line 319 and separate into two pieces: the first label portion 317 and the second label portion 318. The plurality of first indication elements 307 and the plurality of second indication elements 308 are thus movable relative to one another, by rotation of the lock ring 306 relative to the body 301, and become movable relative to one another once the label 316 has been torn along the tear line 319. The first and second indication elements 307, 308 are thus moveable relative to one another between a first state in which at least one of the plurality of first indication elements 307 is not circumferentially aligned with at least one of the plurality of second indication elements 308, and a second position in which said at least one of the plurality of first indication elements 307 is circumferentially aligned with said at least one of the plurality of second indication elements 308.

FIG. 3A shows the first state, in which each of the plurality of first indication elements 307 is not circumferentially aligned with, i.e. is circumferentially spaced apart from, a respective one of the plurality of second indication elements 308. In the first state shown in FIG. 3A, the lock ring 306 is in the first position in which the button 301 is not permitted to move along the longitudinal direction 304 relative to the body 301. FIG. 3B shows the second state, in which each of the plurality of first indication elements 307 is circumferentially aligned with a respective one of the plurality of second indication elements 308. In the second state shown in FIG. 3B, the lock ring 306 is in the second position in which the button 301 is permitted to move along the longitudinal direction 304 relative to the body 301.

Thus, moving the lock ring 306 from the first position into the second position by rotating it relative to the body 301 about the longitudinal axis 347 causes the label 316 to tear along the tear line 319 which permits the first label portion 317 to rotate relative to the second label portion 318 about the longitudinal axis 347. This causes the plurality of first indication elements 307 to move circumferentially relative to the plurality of second indication elements 308, thus causing the plurality of first and second indication elements 307, 308 to move from the first state into the second state, thus aligning them with one another circumferentially. Applying the first and second indication elements 307, 308 to the lock ring 306 and the body 301 respectively by affixing the label 316 ensures that initially, when the lock ring 306 is in the first position, before use of the medicament delivery device 300, the first and second indication elements 307, 308 will be in the first state in which they are not circumferentially aligned, since the first and second label portions 317, 318 are physically attached to one another. Tearing the label 316 along the tear line 319 by rotating the lock ring 306 allows the first label portion 317 to move relative to the second label portion 318 so that the first and second indication elements 307, 308 are then circumferentially aligned with one another when the lock ring 306 is in the second position, thus providing a visual indication of the rotational position of the lock ring 306, so that the user can visually ascertain that the lock ring 306 is in the second position and thus that the button 305 may be depressed to actuate the medicament delivery device 300. Whilst in the example shown and described herein, the first and second indication elements 307, 308 are circumferentially alignable with one another, it is also envisaged that they may be alignable with each other in any other suitable direction or in any other suitable way, for example along a longitudinal and/or radial direction. Furthermore, it is also envisaged that the first portion 309 and hence the plurality of first indication elements 307 need not necessarily be on the lock ring 306, but that they may alternatively be on the button 305 and/or the lock ring 306.

In the example shown in FIGS. 3A and 3B, the first and second indication elements 307, 308 are printed onto the label 316. The first portion 309 of the medicament delivery device 300, provided by the first label portion 317, may comprise a first color 311, for example a neutral background color such as white for example, which may for example be the same color as a main outer surface of the body 301. The plurality of first indication elements 307 may comprise a second color 312 that is different to the first color 311, for example green. In the example shown, each of the first indication elements 307 comprises a pentagonal or arrow shaped shape, although other shapes are also envisaged. The second portion 310 of the medicament delivery device 300, provided by the second label portion 318, may similarly comprise a neutral background color, such as white for example, which may for example be the same color as a main outer surface of the body 301. The second portion 310 may comprise a plurality of third indication elements 313 which may each be arranged adjacent to a respective one of the plurality of second indication elements 308. In the example shown, each of the second indication elements 308 comprises a rhombus shape and each of the third indication elements 313 comprises a square or rectangular shape, although other shapes are also envisaged. The plurality of second indication elements 308 may comprise a third color 314 that is the same as the second color 312 of the first indication elements 307, to help provide a visual indication that the first and second indication elements 307, 308 should be aligned with one another to unlock the lock ring 306. The plurality of third indication elements 313 may comprise a fourth color 315 that is different to the third color 315, for example red.

The second and third indication elements 308, 313 are arranged on the second portion 310 such that when the plurality of first and second indication elements 307, 308 are in the first state, at least one of the plurality of first indication elements 307 is circumferentially aligned with at least one of the plurality of third indication elements 313 (see FIG. 3A for example), and when the plurality of first and second indication elements 307, 308 are in the second state, said at least one of the plurality of first indication elements 307 is not circumferentially aligned with said at least one of the plurality of third indication elements 313. Thus, when the lock ring 306 is in the first position, the first indication elements 307 are circumferentially aligned with the third indication elements 313, and when the lock ring 306 is in the second position, the first indication elements 307 are circumferentially aligned with the second indication elements 308. Thus, whether the first indication elements 307 are aligned with the second or third indication elements 308, 313 will provide a visual indication to the user of the rotational position of the lock ring 306 relative to the body 301. Because the first and second indication elements 307, 308 each comprise a plurality of indication elements 307, 308, which are spaced about the circumference of the medicament delivery device 300, advantageously, said visual indication can be visible from more than one viewing angle or direction, thus providing improved visibility of the rotational state of the lock ring 306. One or more of the plurality of first, second and/or third indication elements 307, 308, 313 may comprise one or more symbols, graphics or icons. For example, in the example shown in FIGS. 3A and 3B, each of the second indication elements 308 comprises an "open padlock" symbol, representing an unlocked state corresponding with the second position of the lock ring 306, and each of the third indication elements 313 comprises a "closed padlock" symbol, representing a locked state corresponding with the first position of the lock ring 306. Each of the first indication elements 307 may comprise a corresponding symbol such as bar or line for example, said bar or line being arranged to be circumferentially aligned with the "closed padlock" when the lock ring 306 is in the first position, and with the "open padlock" when the lock ring 306 is in the second position.

FIGS. 4A and 4B show another exemplary medicament delivery device 300 which is similar to that shown in FIGS. 3A and 3B and described above, other than that the shape and/or pattern of the first, second and third indication elements 307, 308, 313 is different. FIG. 4A shows the lock ring 306 in the first position, such that the first and second indication elements 307, 308 are in the first state in which they are not circumferentially aligned. FIG. 4B shows the lock ring 306 in the second position, such that the first and second indication elements 307, 308 are in the second state in which they are circumferentially aligned. In the example shown, the first label portion 317 comprises a first pattern of squares or rectangles alternating in color, and correspondingly the second label portion 318 comprises a second pattern of squares or rectangles alternating in color. The first and second patterns may be substantially similar, for example they may each comprise squares or rectangles of approximately the same size to one another. In the example shown, the first indication elements 307 each comprise a square or rectangle of a second color 312, for example grey, printed onto a background of a first color 311, for example white. Correspondingly, the second indication elements 308 may then each comprise a square or rectangle of a third color 314 which may be the same as the second color 312, for example grey. Third indication elements 313, for example comprising gaps or spaces of background color arranged between the second indication elements 308, many comprise a fourth color 315, which may for example be the same as the first color 311, for example white.

As shown in the example of FIGS. 4A and 4B, at least one of the first indication elements 307 may comprise a supplementary first indication element 328, for example a printed rectangle or bar and/or a rectangular shaped color protrusion for example. Similarly, at least one of the second indication elements 308 may comprise a supplementary second indication element 329, for example a printed symbol, icon, or logo, such as an "open padlock". Similarly, at least one of the third indication elements 313 may comprise a supplementary third indication element 330, for example a printed symbol, icon, or logo, such as a "closed padlock". The first supplementary indication element 328 may be configured to be aligned with the supplementary third indication element 330 when the lock ring 306 is in the first position, and the first supplementary indication element 328 may be configured to be aligned with the supplementary second indication element 329 when the lock ring 306 is in the second position. Said at least one of the second indication elements 308 may also comprise a directional indicator 348, such as a printed arrow or triangular shape for example, to indicate to the user which direction (i.e. anticlockwise as in the example shown) the lock ring 306 should be rotated in in order to move it from the first position to the second position.

In the examples described above, the medicament delivery device 300 is configured to provide a visual indication of the rotational position of the lock ring 306 relative to the body 301, for example by a plurality of printed and/or colored first and second indication elements 307, 308 which are circumferentially alignable and misalignable with one another to visually indicate the rotational position of the lock ring 306 in a manner that is visible from a plurality of viewing angles or directions. However, it is envisaged that said indication need not necessarily be a visual one, and that the indication of the rotational position of the lock ring 306 may alternatively or additionally be a tactile indication. That is, said indication may for example be visual, tactile, or both visual and tactile. Other forms of indication are also envisaged. An example of a tactile indication shall now be described, with reference to FIGS. 5, 6A and 6B.

Figure 5:
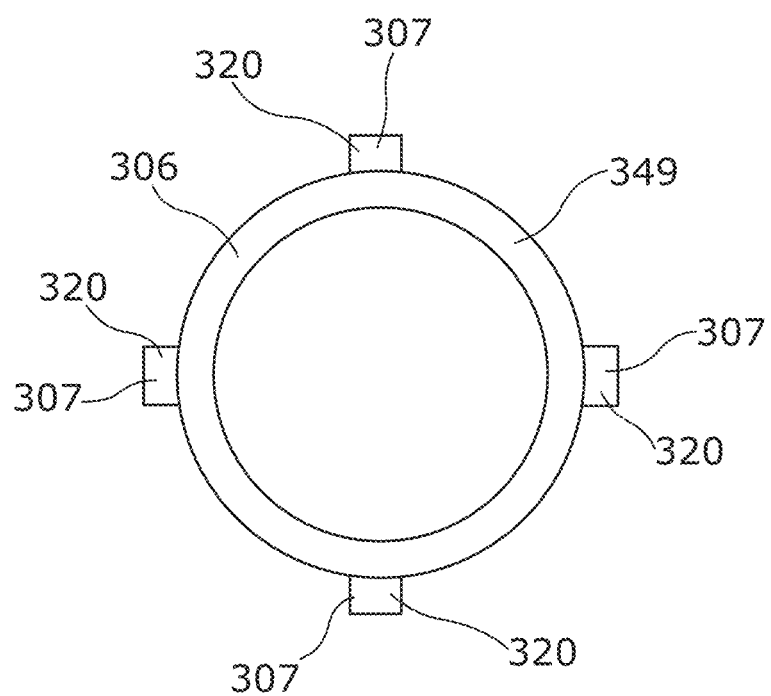
FIG. 5 shows a plan view of a lock ring.

FIG. 5 shows a plan view of an exemplary lock ring 306 which comprises a plurality of first indication elements 307, each in the form of a protrusion 320 protruding radially outwards from a main body 349 of the lock ring 306. In the example shown, there are four first indication elements 307 which are circumferentially equally spaced apart from one another. However, it is envisaged that there need not necessarily be four equally spaced first indication elements 307, and that there may be any number of two or more first indication elements 307, which may be equally/regularly, or irregularly spaced apart from one another circumferentially. For example, there may be any number of two, three, four, five, six, seven, eight or more first indication elements 307, which may be regularly or irregularly spaced apart. In the example shown, each of the first indication elements 307 has a generally rectangular cross sectional profile, however other shapes of protrusion 320 and hence of first indication element 307 are also possible. For example, FIGS. 6A and 6B show a medicament delivery device 300, in which like numerals denote like elements to in the examples described above, in which the lock ring 306 is generally similar to that shown in FIG. 5, albeit the cross-sectional profile of the protrusions 320 which form the first indication elements 307 is generally triangular rather than rectangular, such that the first indication elements 307 are generally tapered.

As shown in the example of FIGS. 6A and 6B, the protrusions 320 which form the first indication elements 307 are integrally formed with the lock ring 306, and similarly, integrally formed with the body 301 there are corresponding protrusions 321 which form the second indication elements 308. As in the examples described above, the protrusions 320 and 321 are circumferentially moveable relative to one another by rotating the lock ring 306 relative to the body 301 about the longitudinal axis 347, in order to selectively align and misalign the first and second indication elements 307, 308. FIG. 6A shows the lock ring 306 in the first position in which the first and second indication elements 307, 308 are in a first state in which the first protrusions 320 are not circumferentially aligned with the second protruding portions 321, and FIG. 6B shows the lock ring 306 in the second position in which the first and second indication elements 307, 308 are in a second state in which the first protrusions 320 are circumferentially aligned with the second protruding portions 321. The first and second protrusions 320, 321 may be sized and shaped relative to one another such that when they are circumferentially aligned, they together form, in respective pairs, a generally continuous protrusion, which may advantageously help improve the user's grip of and tactile feedback of the medicament delivery device 300. Thus, the protrusions 320, 321 may provide for improved intuition of how to rotate the lock ring 306 to unlock the button 305, and also for improved visual and tactile feedback from multiple viewing angles or directions of the current rotational position of the lock ring 306. Whilst in the example shown, the tactile indicator is in the form of a plurality of protrusions 320, 321, it is also envisaged that the tactile indicator may have any other suitable form, such as the first portion 309 and/or the second portion 310 comprising a different surface texture to the remainder of the first 309 and/or second portion 310 respectively, such that the region(s) of different surface texture provide the first and/or second indication elements 307, 308. Tactile indicators may be particularly useful for users with impaired vision, for example those who are blind or partially sighted. Tactile indicators may be combined with visual indicators. For example, it is envisaged that the medicament delivery device 300 may comprise both protrusions 320, 321 and one or more colored or printed indication elements 307, 308 in combination.

FIGS. 7A, 7B and 8 show an exemplary medicament delivery device 300 comprising another form of visual indicator for indicating the rotational position of the lock ring 306 relative to the body 301. The medicament delivery device comprises a spring, such as a spring 260 described above in relation to the examples of FIGS. 2A to 2G, which is configured to bias the button 305 towards the extended, undepressed position, such that pushing the button 305 inwards towards the distal end 303 of the medicament delivery device 300 goes against the biasing action of the spring 260. A portion of a spring guide 325 is arranged inside the lock ring 306 and is configured to house and constrain the spring 260. The spring guide 325 comprises a main body 326, which in the example shown is generally hollow and cylindrical, although other shapes are also envisaged. Protruding from the main body 326 are a plurality of radially outwardly extending connecting portions 327, for example three equally spaced outwardly extending arms, which connect the main body 326 to an indicator ring 322. The button 305 may comprise one or more protruding arms 344, for example three circumferentially equally spaced arms 344 which protrude generally along the longitudinal direction 304, which are configured to rotationally contact, engage with and/or abut with the connecting portions 327, in order to limit the circumferential range of motion of the lock ring 306 and the button 205 together relative to the body 301.

The main body 326 is configured to be received inside the lock ring 306, and the indicator ring 322 is configured to be arranged outside of the lock ring 306 and to circumscribe the portion of the button 305 which comprises the first portion 309 comprising the first indication elements 307, to overlap with. Thus, in the example shown, the first portion 309 of the medicament delivery device 300 which comprises the plurality of first indication elements 307 is on the button 305, and the second portion 310 of the medicament delivery device 300 which comprises the plurality of second indication elements 308 is on the indicator ring 322. The indicator ring 322 overlaps longitudinally with the button 305, such that the first and second portions 309, 310 longitudinally overlap with one another.

The first portion 309 on the button 305 comprises a pattern of alternating first indication elements 307 and spacing portions 324 arranged therebetween. The first indication elements 307 and the spacing portions 324 are shaped and sized to be the same size and shape as one another, to form a first pattern which tessellates and alternates the first indication elements 307 and the spacing portions 324. The first indication elements 307 are a different color to the spacing portions 324 to provide the first pattern. In the example shown, the first indication elements 307 and the spacing portions 324 each generally comprise a chevron or arrow shape which tesselate with one another circumferentially around the first portion 309 on the button 305. Similarly, the indicator ring 322 also comprises an alternating and tessellating pattern, a second pattern, which is substantially the same as the first pattern. That is, the shapes on the indicator ring 322 which form the second pattern are generally the same shape and size as the shapes which form the first pattern. In particular, the indicator ring 322 comprises a plurality of masking portions 323 which are generally the same size and shape as the first indication elements 307 and the spacing portions 324, and which are configured to mask the first indication elements 307 when circumferentially aligned therewith. Arranged between the masking portions 323, the indicator ring 322 comprises the plurality of second indication elements 308, each in the form of a cut-out, gap, spacing or aperture, as shown in FIG. 8, through which the first indication elements 307 may be visible.

By provision of the masking portions 323, and by the indicator ring 322 being longitudinally overlapping with and circumscribing the portion of the button 305 which comprises the first indication elements 307, the button 305 may be rotated relative to the indicator ring 322, caused by rotation of the lock ring 306, in order to selectively move the first indication elements 307 from a position in which they are obstructed by the masking portions 323 and so cannot be seen, into a position in which they are unobstructed by the masking portions 323 and can be seen through the second indication elements 308, which in the example shown comprise said cut-outs, gaps, spacings or apertures, which are circumferentially spaced around the indicator ring 322. Thus, when the lock ring 306 is in the first position and the first and second indication elements 307, 308 are in the first state, each of the plurality of first indication elements 307 is aligned with a respective one of the plurality of masking portions 323, such that the plurality of first indication elements 307 are not visible. In this first state, the spacing portions 324 are circumferentially aligned with the second indication elements 308 and are thus visible therethrough. Because the spacing portions 324 are visually different to the first indication elements 307, for example by comprising a different color, pattern and/or surface decoration thereto, the user can thus see that the first indication elements 307 are not aligned with the second indication elements 308 and thus that the lock ring 306 is in the first state such that the button 305 is locked. When the lock ring 306 is in the second position and the first and second indication elements 307, 308 are in the second state, each of the plurality of first indication elements 307 is not aligned with a respective one of the plurality of masking portions 323, such that the plurality of first indication elements 307 are visible. In this second states, the spacing portions 324 are circumferentially aligned with the masking portions 323, such that the spacing portion 324 are not visible, but the first indication elements 307 are visible through the second indication elements 308. In this manner, the lock ring 306 and the button 305 may be rotated relative to the indicator ring 322 such that when the lock ring 306 is in the first position, a first color 311 (corresponding with the spacing portions 324) is visible through the second indication elements 308, thus indicating a locked state, and such that when the lock ring 306 is in the second position, a different second color 213 is visible through the second indication elements 308, thus indicating an unlocked state.

Figures 9A, 9B, 10:
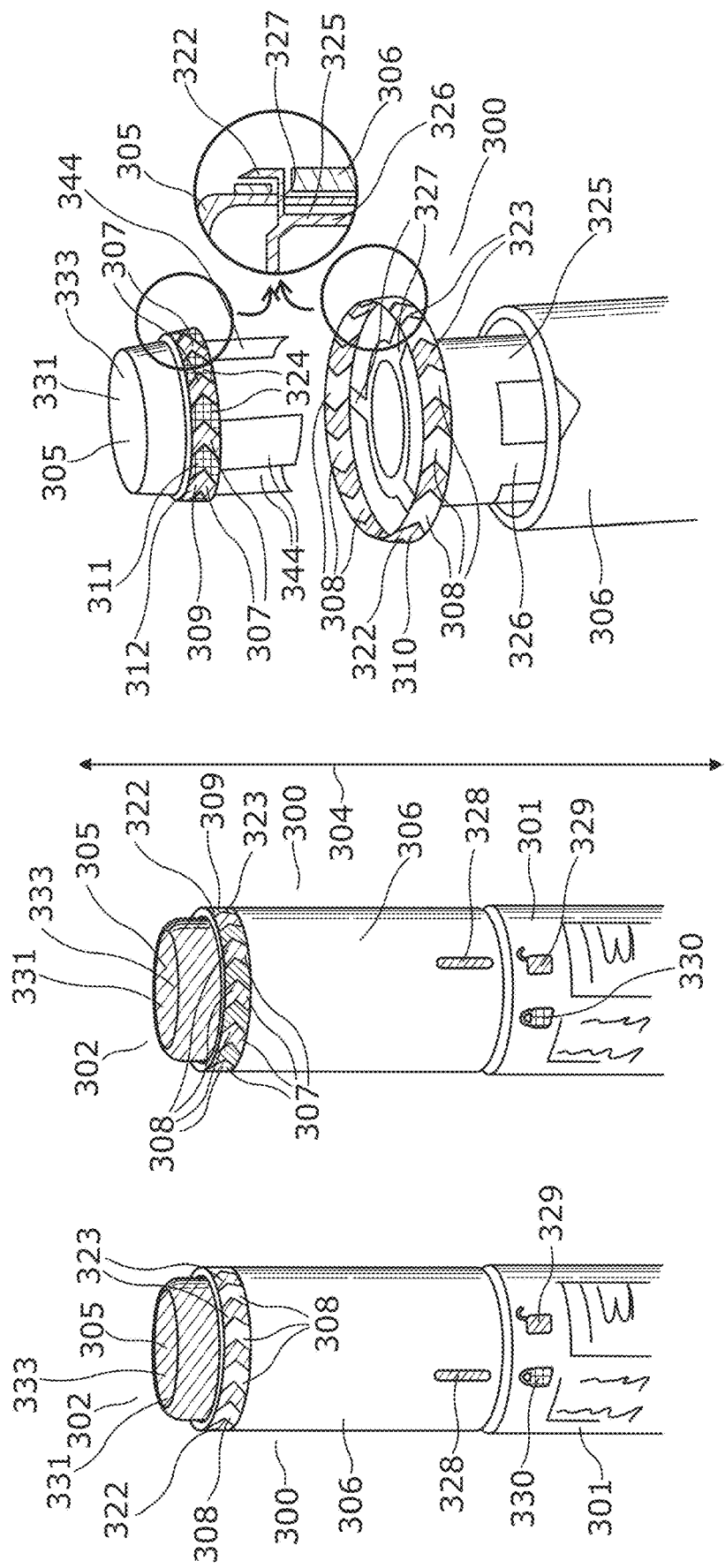
FIG. 9A shows a medicament delivery device comprising a lock ring in a first position.
FIG. 9B shows a medicament delivery device comprising a lock ring in a second position.
FIG. 10 shows an exploded view and a zoomed in detailed cross-sectional view of a medicament delivery device.

The exemplary medicament delivery device 300 shown in FIGS. 9A, 9B and 10 is substantially similar to that shown in FIGS. 7A, 7B and 8 and described above, other than that the second indication elements 308, instead of each comprising a cut-out, gap, spacing or aperture, each comprise a generally transparent or translucent section. Thus, the second indication elements 308 and the masking portions 323 may be coupled to or integrally formed with one another. For example, the indicator ring 322 may be formed from a generally transparent or translucent material, and the masking portions 323 may be printed onto or otherwise applied onto the indicator ring 322 to form opaque portions thereon or at least portions with relatively increased opacity thereon, leaving spaced portions therebetween which form the generally transparent or translucent second indication elements 308. In this manner, when the lock ring 306 is in the first position, the spacing portions 324 are visible through the second indication elements 308, and when the lock ring 306 is in the second position, the spacing portions 324 are circumferentially aligned with the masking portions 324 such that they are not visible, and instead, the first indication elements 307 are visible through the second indication elements 308.

In the exemplary medicament delivery devices 300 shown in FIGS. 7A, 7B, 8, 9A, 9B and 10, the medicament delivery device 300 may further comprise a supplementary indication means in the form of a supplementary first indication element 328 on the lock ring 306, and supplementary second and third 329, 330 indication elements on the body 301, for example. These may be similar to the supplementary first, second and third indication elements 328, 329, 330 shown in FIGS. 4A and 4B and described above in relation thereto. For example, the supplementary first indication element 328 may comprise a printed rectangle or bar and/or a rectangular shaped color protrusion for example. The supplementary second indication element 329 may comprise a printed symbol, icon, or logo, such as an "open padlock" for example. The supplementary third indication element 330 may comprise a printed symbol, icon, or logo, such as a "closed padlock" for example. The first supplementary indication element 328 may be configured to be aligned with the supplementary third indication element 330 when the lock ring 306 is in the first position, and the first supplementary indication element 328 may be configured to be aligned with the supplementary second indication element 329 when the lock ring 306 is in the second position. The supplementary indication means may provide a secondary form of visual and/or tactile indication of the rotational position of the lock ring 306, to further assist the user in ascertaining the rotational position of the lock ring 306, in addition to the visual indication provided by the indicator ring 322 and the first indication elements 307, which may be ascertainable from a plurality of viewing angles or directions.

In order to provide further enhanced visibility of the rotational position of the lock ring 306, it is envisaged that one or more of the different examples of first and second indication elements 307, 308 and/or supplementary indication elements 328, 329, 330 described above may be combined with one another. For exemplary, a medicament delivery device 300 may comprise visual first and second indication elements 307, 308 according to both the examples of FIGS. 3A and 3B and FIGS. 7A and 7B in the same medicament delivery device 300.

Turning now to FIGS. 11A, 11B and 11C, a further means of indicating the rotational position of the lock ring 306, and hence also the state of usage of the medicament delivery device 300, which may be considered to be a form of both visual and tactile indication, may be to provide two or more longitudinal positions of the button 305 relative to the body 301. The longitudinal position of the button 305 may then be ascertained visually and/or by touch in order to determine the rotational position of the lock ring 306, and also advantageously, to ascertain whether the medicament delivery device 300 is in a pre-use state, a use state, or a post-use state. This may be done by linking axial movement of the button 305 along the longitudinal direction 304 to rotational movement of the lock ring 306 about the longitudinal axis 347, such that rotating the lock ring 306 relative to the body 301 causes the button 305 to move relative to the body 301 along the longitudinal direction 304. This may be provided in addition to or instead of the exemplary means described above for providing visual and/or tactile indicators, for example on the button 305, lock ring 306 and/or body 301, to indicate the position of the lock ring 306, such as the examples shown in FIGS. 3A through to 10. That is, the examples shown in FIGS. 11A through to 13C and described hereinafter may be used in combination with the examples shown in FIGS. 3A through to 10, or they may be used in medicament delivery devices 300 which do not comprise the exemplary indication means of the examples of FIGS. 3A through to 10.

The button 305 is movable along the longitudinal direction 304 relative to the body 301 such that it may be pressed/depressed to move it closer to the distal end 303, and it may be biased towards the proximal end 302, for example by a spring as described above. The button 305 may be arrangeable in an extended position (see FIG. 11B for example), which may be referred to as a fully presented position, in which a proximal portion 331 and a distal portion 332 of the button 305 are both arranged to protrude out from the lock ring 306 along the longitudinal direction 304, such that an actuation surface 333 of the button 305 is arranged to be spaced apart from a proximal end surface 334 of the lock ring 306. The button 305 may also be arrangeable in a retracted position (see FIG. 12A for example), which may be referred to as a fully depressed position, in which the proximal and distal portions 331, 332 of the button 205 are both arranged inside the lock ring 306, such that the actuation surface 333 of the button 305 is arranged to be generally flush with, i.e. generally parallel with in a plane generally normal to the longitudinal axis 347, the proximal end surface 334 of the lock ring 306. The button 305 may also be arrangeable in an intermediate position which is longitudinally between the extended and retracted positions (see FIG. 11A for example), and which may be referred to as a partially presented or partially depressed position. When the button 305 is in the intermediate position, the proximal portion 331 is arranged to protrude out from the lock ring 306, whilst the distal portion 332 is arranged inside the lock ring 306. The longitudinal movement of the button 305 between two or more of these positions may be mechanically linked to the rotational movement of and/or rotational position of the lock ring 306, in order that the button 305 itself may advantageously provide a visual and/or tactile indication of the rotational position of the lock ring 306, by means of its longitudinal position relative to the body 301.

For example, FIGS. 11A to 11C show an exemplary medicament delivery device 300 which provides that moving the lock ring 306 from the first position into the second position causes the button 305 to move along the longitudinal direction 304 from an intermediate position (see FIG. 11A) into an extended position (see FIG. 11B). Upon completion of the movement of the lock ring 306 from the first position into the second position, the button 305 becomes depressible, such that the medicament delivery device 300 becomes actuatable, and the button 305 may then be pressed back into the intermediate position as shown in FIG. 11C, thus indicating that the medicament delivery device 300 has been used. In the example shown, the distal portion 332 of the button comprises a different color, pattern and/or surface decoration to the proximal portion 331 of the button, so that the user may more easily visually distinguish between the intermediate and extended positions of the button 305, since the distal portion 332 will only be visible in the extended position, but not in the intermediate position. The user may also distinguish by touch what rotational position the lock ring 306 is in and what state the medicament delivery device 300 is in, by feeling how far out the button 305 is and hence whether it is in the intermediate position or the extended position. The proximal portion 331 of the button 305 may provide a first portion 335 of a visual indicator of the button 305, and the distal portion 332 may similarly provide a second portion 336 of the visual indicator of the button 305, such that the user may determine the longitudinal position of the button 305 based on whether the first and/or second positions 335, 336 are visible or not at a given point in time.

Figures 12A, 12B, 12C:
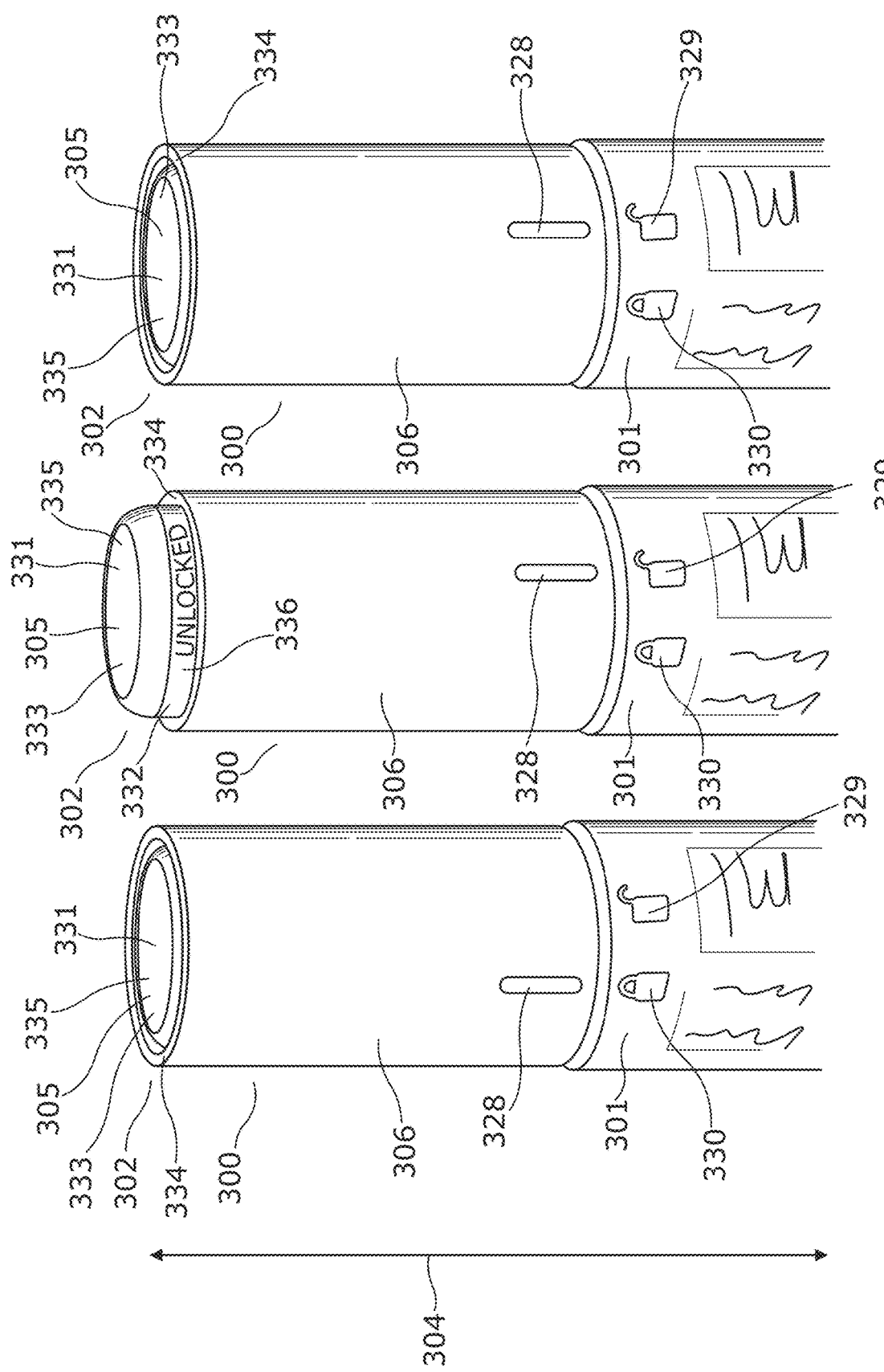
FIG. 12A shows a medicament delivery device in a pre-use state comprising a lock ring in a first position.
FIG. 12B shows a medicament delivery device in a ready to use state comprising a lock ring in a second position.
FIG. 12C shows a medicament delivery device in a post-use state comprising a lock ring in a second position.

In the example of FIGS. 12A to 12C, the medicament delivery device 300 is generally similar to that shown in FIGS. 11A to 11C and described above, other than that the button 305 is configured to be in the retracted position when the lock ring 306 is in the first position, and the button 305 is also configured to be moveable into the retracted position after completion of the rotation of the lock ring 306 into the second position has been completed, to help visually and tactilely indicate that the medicament delivery device 300 has been used.

FIGS. 13A to 13C show another example of a medicament delivery device 300, which combines the different button positions shown in the examples of FIGS. 11A through to 12C, to advantageously provide for further enhanced visual and/or tactile feedback and indication of the rotational position of the lock ring 306 and the state of the medicament delivery device 300. FIG. 13A shows the medicament delivery device 300 in a pre-use state in which medicament has not yet been dispensed from the needle 217, and the lock ring 306 is in the first position, to lock the button 305 longitudinally such that the button 305 may not be pressed and the medicament delivery device 300 may not be actuated. The button 305 is in the intermediate position to show that it is depressible, that the medicament delivery device 300 has not yet been used, and that the lock ring 306 is still in the first position.

Next, once the user is ready to use the medicament delivery device 300, the lock ring 306 is rotated from the first position (see FIG. 13A) into the second position (see FIG. 13B). In the example shown, the medicament delivery device 300 comprises supplementary first, second and third 328, 329, 330 indication elements to visually indicate that the lock ring 306 has been moved into the second position, although it is envisaged that these need not necessarily be present. Rotating the lock ring 306 from the first position into the second position shown in FIG. 13B causes the button 305 to move away from the body 301 and the lock ring 306 along the longitudinal direction 304, such that the distal portion 332 of the button 305 becomes exposed by pulling it out from inside the lock ring 306 such that it protrudes therewith together with the proximal portion 331 of the button 305. The user may thus be provided with both a visual and tactile indication that the lock ring 306 is in the second position and the medicament delivery device 300 is ready for use, since the button 305 is in the extended position. Since moving the lock ring 306 into the second position permits the button 305 to move along the longitudinal direction 304 relative to the body 301 towards the distal end 303, this permits the button 305 to be depressible such that the user may apply a force to the actuation surface 333 to push the button 305 in towards the distal end 303 to actuate the medicament delivery device 300, to place the button 305 in the retracted position. After use of the medicament delivery device 300, i.e. after medicament delivery, the medicament delivery device 300 is in a post-use state as shown in FIG. 13C, and the button 305 may be configured in this state to be in the fully depressed, i.e. retracted position. Advantageously, this provides a visual and tactile indication, irrespective of looking at any visual indicators 307, 308, of the rotational position of the lock ring 306, and also of whether the medicament delivery device 300 is in a pre-use or post-use state. That is, in the position shown in FIG. 13A, the lock ring 306 is in the first position and the medicament delivery device 300 is in a pre-use state, and the button 305 is in a different longitudinal position to in the post-use state shown in FIG. 13C. This is advantageous because the user can then visually and/or by touch ascertain whether a given medicament delivery device 300 is in a pre-use or post-use state, because the longitudinal position of the button 305 is different in the two states.

This differs from the examples of FIGS. 11A to 12C in which the button 305 is in the same longitudinal position in the pre-use and post-use states. Thus, in the examples of FIGS. 11A to 12C, feedback is only given of whether the medicament delivery device 300 is ready for use or not, but the user may not be able to readily ascertain whether the medicament delivery device 300 is actually new and ready for use, or whether it has already been used. This is because in the example of FIGS. 11A and 11C for example, the button 305 is in the intermediate position for both the pre-use and post-use states, and similarly in the example of FIGS. 12A and 12C, the button 305 is in the retracted position for both the pre-use and post-use states. Thus, in those examples, only two longitudinal positions of the button 305 are provided. Advantageously, the example of FIGS. 13A to 13C provides for three longitudinal positions of the button 305, each corresponding with a respective state of the medicament delivery device 300: pre-use, ready for use, and post-use. Whilst in the example shown, the button 305 is in the intermediate position when the medicament delivery device 300 is in the pre-use state wherein the lock ring 306 is in the first position, and the button 305 is in the retracted position when the medicament delivery device 300 is in the post-use state wherein the lock ring 306 is in the second position, it is also envisaged that these button 305 positions may be swapped with one another. For example, the medicament delivery device 300 may be configured such that when the medicament delivery device 300 is in the pre-use state wherein the lock ring 306 is in the first position, the button 305 may be in the retracted position, and when the medicament delivery device 300 is in the post-use state wherein the lock ring 306 is in the second position, the button 305 may be in the intermediate position.

An exemplary mechanism which may provide for such exemplary longitudinal movement of the button 305 relative to the body 301 along the longitudinal direction 204 shall now be described, with reference to FIGS. 14A to 14C. FIGS. 14A to 14C show a medicament delivery device 300 which is generally similar to that shown in FIGS. 13A to 13C, and which comprises a spring 260 configured to bias the plunger 223 distally as described above, and a spring guide 325 arranged to house and guide the spring 260. The spring guide 325 comprises an engagement surface 337, relative to which an engagement element 338 of the button 305 is configured to move. In the example shown, the engagement element 338 is generally block or wedge shaped and comprises an angled surface 343 configured to move relative to and contact, abut or engage with, the engagement surface 337. In the example shown, the engagement element 338 is integrally formed with the button 305, although it is also envisaged that the engagement element 338 may otherwise be coupled to the button 305. It is also envisaged that the engagement element 338 need not necessarily comprise an angled surface 343 and need not necessarily be generally block or wedge shaped, and that the engagement element 338 may have any other suitable shape or form, for example it may comprise a roller. The engagement element 338 is configured to move along a generally circumferential direction which circumscribes the longitudinal axis 347, relative to the engagement surface 337, upon rotation of the lock ring 306 relative to the body 301. The button 305 is coupled to the lock ring 306 such that rotation of the lock ring 306 causes the button 306 to also rotate relative to the body 301 about the longitudinal axis 347. The spring guide 325 is fixed relative to the body 301, hence rotation of the lock ring 306 and the button 305 relative to the body 301 causes the button 305, and hence the engagement element 338, to rotate relative to the spring guide 325, and hence relative to the engagement surface 337 thereof. Accordingly, rotation of the lock ring 306 from the first position into the second position causes circumferential movement of the engagement element 338 relative to and along the engagement surface 337.

The engagement surface 337 may be shaped, relative to the circumferential direction and/or the longitudinal direction 304, to provide for mechanical conversion of rotational movement of the lock ring 306 into longitudinal movement of the button 305. In the example shown, the engagement surface 337 comprises a first portion 339, a second portion 340, a third portion 341, and a fourth portion 342. The second portion 340 is arranged between the first portion 339 and the third portion 341, and the third portion 341 is arranged between the second portion 340 and the fourth portion 342. That is, the first, second, third and fourth portions 339, 340, 341 and 342 are arranged sequentially along the circumferential direction.

In the example shown in FIGS. 14A to 14C, the first portion 339 extends in a generally circumferential direction that is generally normal to the longitudinal axis 347. Accordingly, as the engagement element 338 moves relative to the engagement surface 337 along the first portion 339 thereof, the engagement element 338 will be guided to move in a direction that is generally circumferential and is axially constant. That is, because the first portion 339 extends generally in the circumferential direction and does not extend in the longitudinal direction 304, the engagement element 338 will be guided to move circumferentially and not longitudinally, i.e. the engagement element 338 will not move along the longitudinal direction 304. Hence, along a first range of rotational motion of the lock ring 306 from the first position towards the second position, which causes the button 305 to rotate along a first range of motion, the button 305 remains in a constant axial position relative to the longitudinal direction 304, and thus remains in the intermediate position, as shown in FIG. 13A for example.

The second portion 340 is arranged to be angled relative to the longitudinal direction 304 between the proximal end 302 and the distal end 303. In the example shown, between the first portion 339 and the third portion 341, the second portion 340 is angled in a direction away from the distal end 303 and towards the proximal end 302. That is, an end region of the first portion 339 which interfaces with the second portion 340 is located relatively closer to the distal end 303, whereas an end region of the third portion 341 which interfaces with the second portion 340 is located relatively closer to the proximal end 302. Accordingly, as the engagement element 338 moves relative to the engagement surface 337 along the second portion 340 thereof, the engagement element 338 will be guided to move in a direction that has both a circumferential component and a longitudinal component. That is, because the second portion 340 extends diagonally and so itself has both a circumferential component and a longitudinal component, the engagement element 338 will be guided to move both circumferentially and longitudinally, along the diagonal direction shown by the arrow 351 in FIG. 14B. The engagement element 338 will be guided to move further circumferentially, as the lock ring 306 is rotated further towards the second position, and simultaneously the engagement element 338 will also be guided to move axially along the longitudinal direction 304, towards the proximal end 302, along the direction shown by the arrow 352 in FIG. 14B. Thus, along a second range of rotational motion of the lock ring 306 from the first position further towards the second position, which causes the button 305 to rotate along a second range of motion, the button 305 is caused to be moved longitudinally outwards towards the proximal end 302, and may thus automatically be caused to be moved into the presented, extended position, as shown in FIG. 13B for example. The button 305 is then ready to be depressed to actuate the medicament delivery device 300, and so the medicament delivery device 300 is in a ready to use state.

Advantageously, at the stage shown in FIG. 14B during which the user is rotating the lock ring 306 into the second position, if the user inadvertently applies an actuation force to the actuation surface 333 of the button 305 during rotation of the lock ring 306, i.e. if they try to actuate the button 305 before the button 305 has been unlocked and before the medicament delivery device 300 is ready for use, then the user will be provided with resistance which may help them realise that it is too soon to actuate the button 305. In particular, if the user attempts to hold and actuate the button 305 during location of the lock ring 306, then the torque to rotate the lock ring 306 will increase when the angled surface 343 of the engagement element 338 of the button 305 contacts the second portion 340 of the engagement surface 337, because the angled second portion 340 will convert some of the press force of the button 305, i.e. the actuation force on the actuation surface 333, into a rotary torque. The user may feel this increased force and the movement of the button 305 and then realise that something is wrong and that they should stop pressing the button 305 until the lock ring 306 has been rotated into the second position and the button 305 will then be free to move along the longitudinal direction 304 to actuate the medicament delivery device 300.

In the example shown, the third portion 341 extends in a generally linear longitudinal direction that is generally parallel to the longitudinal axis 347. Relative to the longitudinal axis 347, the third portion 341 has a longer length than the second portion 340. Thus, the fourth portion 342, which is connected to the third portion 341, is arranged to be relatively lower down than the first portion 339, when the medicament delivery device 300 is in an orientation such that the proximal end 302 is arranged to be vertically above the distal end 303. That is, the fourth portion 341, which is generally parallel to the first portion 339 and also extends in a generally circumferential direction that is generally normal to the longitudinal axis 347, is arranged to be relatively closer to the distal end 303, compared with the first portion 339 which is arranged to be relatively closer to the proximal end 302. The third portion 341 thus allows the button 305 to be pressed inwards towards the distal end 303 from the extended, presented position towards the retracted position, for example as shown in FIG. 13C. The fourth portion 342 may be configured to then prevent/block the button 305 from moving any further along the longitudinal direction 304 towards the distal end 303, such that the button 305 ends its range of rotational motion, corresponding with the lock ring 306 moving from the first position into the second position, with the retracted position in which the actuation surface 333 is generally flush with the proximal end surface 334 of the lock ring 306 and the actuation surface 333 is not able to move further towards the distal end 303 inside the lock ring 306. FIG. 14C shows the button 305 in the same position as shown in the example of FIG. 13C. To additionally prevent further rotational movement of the button 305, i.e. as the lock ring 306 is placed into the second position, the spring guide 325 may also comprise one or more circumferential blocking elements 345 configured to engage with one or more protruding arms 344 of the button 305, to prevent the button 305 from being rotated further, and/or the lock ring 306 may comprise one or more longitudinal blocking elements 346 similarly arranged to engage with one or more protruding arms 344 of the button 305, to prevent the button 305 from being rotated further relative to the body 201 and/or relative to the lock ring itself 306.

Thus, the engagement surface 337 may be configured to guide the engagement element 338 of the button 305 along the longitudinal direction 304 as the button 305 is rotated relative to the engagement surface 337. The engagement surface 337 shown in FIGS. 14A to 14C is an example of an engagement surface 337 and it is envisaged that other shapes and forms of engagement surface 337 are also possible. The engagement surface 337 may have any one or more of the exemplary first, second, third and fourth portions 339, 340, 341, 342 as shown in FIGS. 14A to 14C and described above, and/or may comprise any one or more additional portions or surfaces. For example, where it is desired to provide that the button 305 remains in an axially constant longitudinal position relative to the longitudinal direction 304 for a particular rotational range of motion, the engagement surface 337 may comprise a portion which is generally circumferential and is generally normal to the longitudinal axis 347 such that said portion does not extend along the longitudinal direction 304. Where it is desired to provide that the button 305 moves axially outwards towards the proximal end 302/away from the distal end 303 along the longitudinal direction 304 for a particular rotational range of motion, then the engagement surface 337 may comprise a portion that is generally angled and extends diagonally with a circumferential component and an axial component away from the distal end 303 and towards the proximal end 302 along said particular rotational range of motion. Conversely, where it is desired to provide that the button 305 moves axially inwards towards the distal end 303 along the longitudinal direction 304 for a particular rotational range of motion, then the engagement surface 337 may comprise a portion that is generally angled and extends diagonally with a circumferential component and an axial component away from the proximal end 302 and towards the distal end 303 along said particular rotational range of motion. Where it is desired to provide that the button moves suddenly in a longitudinal direction 304, for example to allow the button 305 to be pressed to actuate the medicament delivery device 300, then the engagement surface 337 may comprise a portion that is generally linear and generally parallel to the longitudinal direction 304. Where it is desired to provide that the button 305 is subsequently prevented from moving further along the longitudinal direction 304, then the engagement surface 337 may comprise a blocking portion that extends generally circumferentially in a direction that is generally normal to the longitudinal axis 347.

Figure 15:
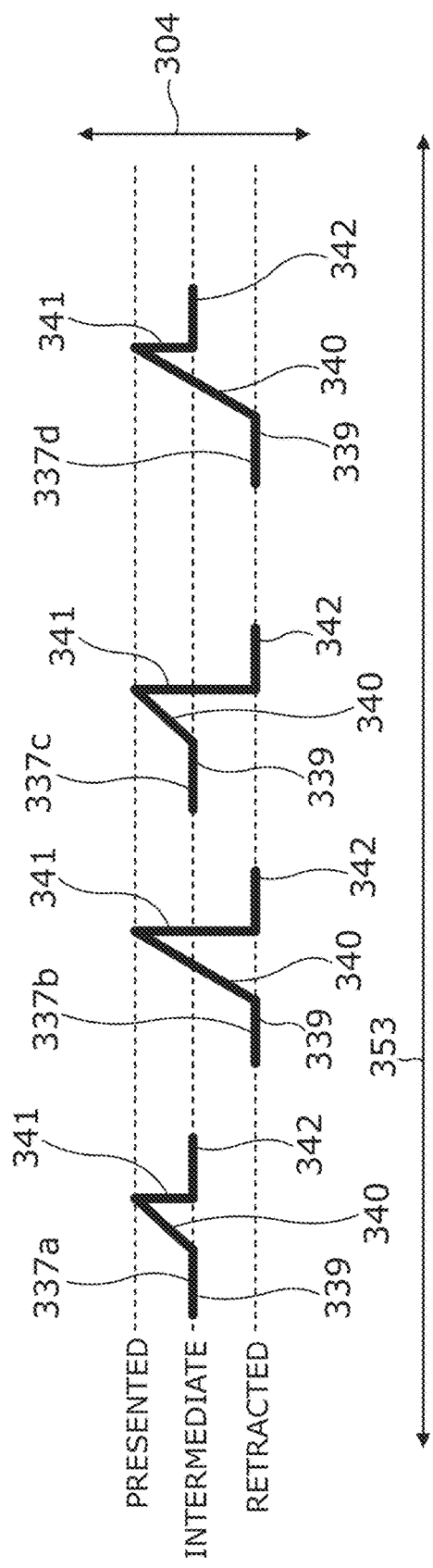
FIG. 15 shows a simplified schematic view of four exemplary engagement surfaces.

Accordingly, FIG. 15 shows some examples of possible configurations of engagement surface 337 which may be employed, depending on the desired axial movement of the button 305 between the first and second rotational positions of the lock ring 305. In FIG. 15, the three horizontal dotted lines represent the presented, intermediate and retracted axial positions of the button 305 along the longitudinal direction 304, as the lock ring 306 and hence also the button 305 rotate, thus causing the engagement element 338 to move along the circumferential direction 353. Simplified schematic views of the exemplary engagement surfaces 337 illustrated are denoted with the reference numerals 337a, 337b, 337c and 337d.

The exemplary engagement surface 337a corresponds with the exemplary medicament device 300 shown in FIGS. 11A to 11C, in which the button 305 is configured to be initially in an intermediate position when the lock ring 306 is in the first position, and moving the lock ring 306 from the first position to the second position is configured to cause the button 305 to move into the extended, presented position. Pressing the button 305 to actuate the medicament delivery device 300 then causes the button 305 to move back into the intermediate position. In order to provide this longitudinal movement of the button 305 from the intermediate position to the presented position and then back to the intermediate position, unlike in the example shown in FIGS. 14A to 14C, the third portion 341 has approximately the same length as the second portion 340 relative to the longitudinal direction 304, such that the fourth portion 342 is generally level with the first portion 339 along the longitudinal direction 304, thus causing the button 305 to finish its rotational range of motion back in the same axial position in which it started.

The exemplary engagement surface 337b corresponds with the exemplary medicament device 300 shown in FIGS. 12A to 12C, in which the button 305 is configured to be initially in the retracted position when the lock ring 306 is in the first position, and moving the lock ring 306 from the first position to the second position is configured to cause the button 305 to move into the extended, presented position. Pressing the button 305 to actuate the medicament delivery device 300 then causes the button 305 to move back into the retracted position. In order to provide this longitudinal movement of the button 305 from the retracted position to the presented position and then back to the retracted position, similarly to in the exemplary engagement surface 337a, the third portion 341 has the same length as the second portion 340 relative to the longitudinal direction 304, such that the fourth portion 342 is generally level with the first portion 339 along the longitudinal direction 304, thus causing the button 305 to finish its rotational range of motion back in the same axial position in which it started.

If it is desired for the button 305 to finish its rotational range of motion in a different axial position in which it started, to provide a visual and tactile indication of whether the button 305 has been depressed or not yet, and hence whether the medicament delivery device 300 is in a pre-use or post-use state, for example as in the example of FIGS. 13A through to 14C, then as described above in relation to the example of FIGS. 14A to 14C, the third portion 341 may be angled and may be sized to be a different length to the second portion 340 relative to the longitudinal direction 304, such that the first portion 339 and the fourth portion 342 are stagged relative to one another, i.e. such that they are spaced apart from one another along the longitudinal direction 304.

For example, if it is desired for the button 305 to be in the intermediate position when the lock ring 306 is in the first position, and for the button 305 to finish its rotational range of motion, post-use of the medicament delivery device 300, when the lock ring 306 is in the second position, in the retracted position, then the exemplary engagement surface 337c may be employed, which corresponds with the example of FIGS. 13A through to 14C. Conversely, if it is desired for the button 305 to be in the retracted position when the lock ring 306 is in the first position, and for the button 305 to finish its rotational range of motion, post-use of the medicament delivery device 300, when the lock ring 306 is in the second position, in the intermediate position, then the exemplary engagement surface 337d may be employed. In the engagement surface 337d, the third portion 341 has a shorter length than the second portion 340 along the longitudinal direction 304, such that the fourth portion 342 is arranged to be relatively closer to the proximal end 302 and the first portion 339 is arranged to be relatively closer to the distal end 303. Furthermore, whilst in the examples shown, the first, second, third and fourth portions 339, 340, 341, 342 of the exemplary engagement surfaces 337, 337a, 337b, 337c, 337c are generally straight and linear, it is also envisaged that one or more of the portions 339, 340, 341, 342 may be generally curved. For example, the angled second portion 340 may be generally curved.

Figure 16:
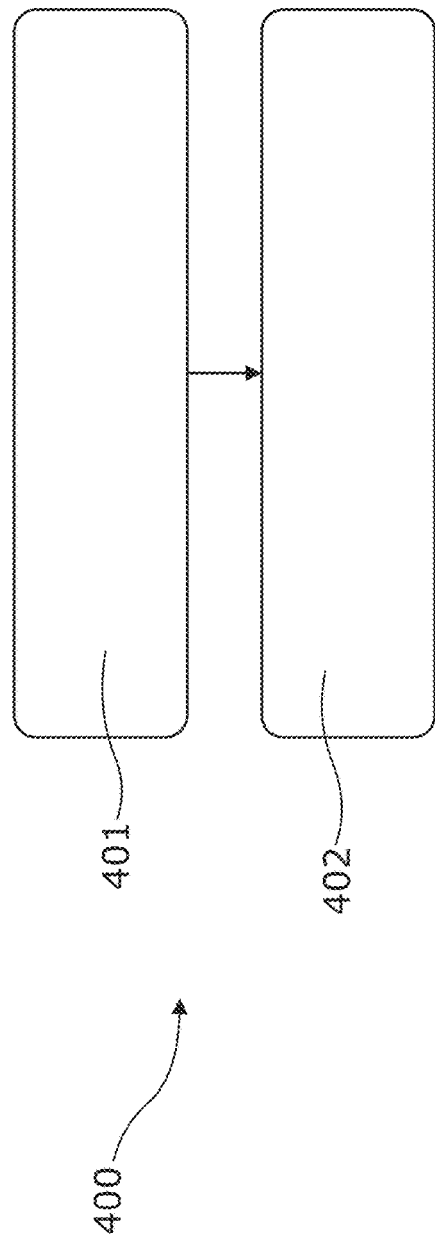
FIG. 16 shows a flowchart illustrating a method of operating a medicament delivery device.

FIG. 16 shows a flowchart depicting a method 400 of operating a medicament delivery device 300, for example a medicament delivery device 300 as described above and/or shown in the preceding drawings. In step 401, the lock ring 306 is rotated from the first position to the second position relative to the body 301 about the longitudinal axis 304, to enable the button 305 to be pushed to actuate the medicament delivery device 300, i.e. to move the button 305 from a locked position into a locked position in which the medicament delivery device 300 may be used. In step 402, the user presses the button 305, by applying a force to the actuation surface 333, for example by pushing on the actuation surface 333, in order to actuate the medicament delivery device 300 to deliver medicament to a patient.

According to the examples shown in FIGS. 3A to 10 and described above, the step 401 of rotating the lock ring 306 relative to the body 301 about the longitudinal axis 304 causes the plurality of first indication elements 307 and the plurality of second indication elements 308 to be moved from the first state in which they are not circumferentially aligned with one another, into the second state in which they are circumferentially aligned with one another. After step 402 of applying an actuation force to the actuation surface 333 of the button 305 to use the medicament delivery device 300, the lock ring 306 may remain in the second position, and the first and second indication elements 307, 308 in the second state, so that the user may ascertain that the medicament delivery device 300 has been used.

According to the examples shown in FIGS. 11A to 15 and described above, the step 401 of rotating the lock ring 306 relative to the body 301 about the longitudinal axis 304 causes the button 305 to move along the longitudinal axis 304 relative to the body 301. Such movement may be in a generally distal direction towards the distal end 303 of the medicament delivery device 300, or in a generally proximal direction away from the distal end 303 of the medicament delivery device 300. Such movement may for example be in a generally proximal direction from an intermediate position into an extended position (see FIGS. 11A to 11B and FIGS. 13A to 13B for example), or from a retracted position into an extended position (see FIGS. 12A to 12B for example). Such movement involves the button 305 moving axially outwards (away from the distal end 303) to provide a visual and tactile indication of the change of state of the lock ring 306 and hence of the button 305 being ready for actuation. In such examples, the step 402 of applying an actuation force to the actuation surface 333 of the button 305 to use the medicament delivery device 300 may cause the button 305 to move along the longitudinal axis 304 relative to the body 301. Such movement may be in a generally distal direction towards the distal end 303 of the medicament delivery device 300. Such movement may for example be from an extended position into an intermediate position (see FIGS. 11B to 11C for example), or from an extended position into a retracted position (see FIGS. 12B to 12C and 13B to 13C for example). Such movement involves the button 305 moving axially inwards/in a generally distal direction (towards the distal end 303) to provide a visual and tactile indication of the change of state of the medicament delivery device 300, i.e. that it has been used.

The method 400 may combine one or more features of the examples of FIGS. 3A to 10 with one or more features of the examples of FIGS. 11A to 15.

The terms "drug" or "medicament" are used synonymously herein and describe a pharmaceutical formulation containing one or more active pharmaceutical ingredients or pharmaceutically acceptable salts or solvates thereof, and In some embodiments a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. In some embodiments, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N—(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RG012 for the treatment of Alport syndrom.

Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, small modular immunopharmaceuticals (SMIP), binding-domain immunoglobulin fusion proteins, camelized antibodies, and immunoglobulin single variable domains. Additional examples of antigen-binding antibody fragments are known in the art.

The term "immunoglobulin single variable domain" (ISV), interchangeably used with "single variable domain", defines immunoglobulin molecules wherein the antigen binding site is present on, and formed by, a single immunoglobulin domain. As such, immunoglobulin single variable domains are capable of specifically binding to an epitope of the antigen without pairing with an additional immunoglobulin variable domain. The binding site of an immunoglobulin single variable domain is formed by a single heavy chain variable domain (VH domain or VHH domain) or a single light chain variable domain (VL domain). Hence, the antigen binding site of an immunoglobulin single variable domain is formed by no more than three CDRs.

An immunoglobulin single variable domain (ISV) can be a heavy chain ISV, such as a VH (derived from a conventional four-chain antibody), or VHH (derived from a heavy-chain antibody), including a camelized VH or humanized VHH. For example, the immunoglobulin single variable domain may be a (single) domain antibody, a "dAb" or dAb or a Nanobody® ISV (such as a VHH, including a humanized VHH or camelized VH) or a suitable fragment thereof. [Note: Nanobody® is a registered trademark of Ablynx N.V.]; other single variable domains, or any suitable fragment of any one thereof.

"VHH domains", also known as VHHs, VHH antibody fragments, and VHH antibodies, have originally been described as the antigen binding immunoglobulin variable domain of "heavy chain antibodies" (i.e., of "antibodies devoid of light chains"; Hamers-Casterman et al. 1993 (Nature 363: 446-448). The term "VHH domain" has been chosen in order to distinguish these variable domains from the heavy chain variable domains that are present in conventional 4-chain antibodies (which are referred to herein as "VH domains") and from the light chain variable domains that are present in conventional 4-chain antibodies (which are referred to herein as "VL domains"). For a further description of VHH's, reference is made to the review article by Muyldermans 2001 (Reviews in Molecular Biotechnology 74: 277-302).

For the term "dAb's" and "domain antibody", reference is for example made to Ward et al. 1989 (Nature 341: 544), to Holt et al. 2003 (Trends Biotechnol. 21: 484); as well as to WO 2004/068820, WO 2006/030220, WO 2006/003388. It should also be noted that, although less preferred in the context of the present invention because they are not of mammalian origin, single variable domains can be derived from certain species of shark (for example, the so-called "IgNAR domains", see for example WO 2005/18629).

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

An example drug delivery device may involve a needle-based injection system as described in Table 1 of section 5.2 of ISO 11608-1:2014(E). As described in ISO 11608-1:2014 (E), needle-based injection systems may be broadly distinguished into multi-dose container systems and single-dose (with partial or full evacuation) container systems. The container may be a replaceable container or an integrated non-replaceable container.

As further described in ISO 11608-1:2014(E), a multi-dose container system may involve a needle-based injection device with a replaceable container. In such a system, each container holds multiple doses, the size of which may be fixed or variable (pre-set by the user). Another multi-dose container system may involve a needle-based injection device with an integrated non-replaceable container. In such a system, each container holds multiple doses, the size of which may be fixed or variable (pre-set by the user).

As further described in ISO 11608-1:2014(E), a single-dose container system may involve a needle-based injection device with a replaceable container. In one example for such a system, each container holds a single dose, whereby the entire deliverable volume is expelled (full evacuation). In a further example, each container holds a single dose, whereby a portion of the deliverable volume is expelled (partial evacuation). As also described in ISO 11608-1:2014 (E), a single-dose container system may involve a needle-based injection device with an integrated non-replaceable container. In one example for such a system, each container holds a single dose, whereby the entire deliverable volume is expelled (full evacuation). In a further example, each container holds a single dose, whereby a portion of the deliverable volume is expelled (partial evacuation).

An example of a compound to be administered with the drug delivery device disclosed herein is a compound with the INN tirzepatide, as referenced in claim 1 of U.S. Pat. No. 9,474,780.

An example of a pharmaceutical composition to be administered with the drug delivery device disclosed herein is a pharmaceutical composition as referenced in U.S. Pat. No. 11,357,820.

An example of a pharmaceutical composition to be administered with the drug delivery device disclosed herein includes a 0.5 mL solution of 2.5 mg, 5 mg, 7.5 mg, 10 mg, 12.5 mg, or 15 mg of tirzepatide and the following excipients sodium chloride (4.1 mg), sodium phosphate dibasic heptahydrate (0.7 mg), and water for injection. Hydrochloric acid solution and/or sodium hydroxide solution may be added to adjust the pH.

An example starting dosage tirzepatide may be 2.5 mg injected subcutaneously once weekly. After four weeks, the tirzepatide dosage may be increased to 5 mg injected subcutaneously once weekly. The dosage may be further increased in 2.5 mg increments after at least four weeks on the current dose. In an example, the maximum dosage of tirzepatide may be 15 mg injected subcutaneously once weekly. If a dose is missed, patients may be instructed to administer tirzepatide as soon as possible within four days (96 hours) after the missed dose.

If more than four days have passed, patients may skip the missed dose and administer the next dose on the regularly scheduled day. In each case, patients may then resume their regular once weekly dosing schedule. The day of weekly administration may be changed, if necessary. The time between two doses may be at least three days (72 hours).

Tirzepatide dosages may include 2.5 mg/0.5 mL, 5 mg/0.5 mL, 7.5 mg/0.5 mL, 10 mg/0.5 mL, 12.5 mg/0.5 mL, and 15 mg/0.5 mL. Tirzepatide may be stored in a refrigerator at 2° C. to 8° C. (36° F. to 46° F.). A single-dose pen or single-dose vial may be stored unrefrigerated at temperatures not to exceed 30° C. (86° F.) for up to 21 days. Tirzepatide may be stored in a carton.

Those of skill in the art will understand that modifications (additions and/or removals) of various components of the embodiments described herein may be made without departing from the full scope and spirit of the present invention, which encompass such modifications and any and all equivalents thereof.

LIST OF REFERENCE NUMBERS

10—device
11—housing
12—cap
13—needle sleeve
17—needle
20—distal region
21—proximal region
22—button
23—piston
200—medicament delivery device
201—body
202—distal end of the body
208—locking member
216—lock ring
217—needle
223—plunger
227—actuation member
228—button
229—dispensing mechanism
232—injection site
240—spring guide
242—protrusions
250—syringe
254—cap
258—stop
260—spring
262—spring
264—clip
265—proximal opening
266—needle shield
267—collar
268—collar
300—medicament delivery device
301—body
302—proximal end
303—distal end
304—longitudinal direction
305—button
306—lock ring
307—first indication elements
308—second indication elements
309—first portion of medicament delivery device
310—second portion of medicament delivery device
311—first color
312—second color
313—third indication elements
314—third color
315—fourth color
316—label
317—first label portion
318—second label portion
319—tear line
320—protruding portion of first indication element
321—protruding portion of second indication element
322—indicator ring
323—masking portions
324—spacing portions
325—spring guide
326—main body of spring guide
327—connecting portions
328—supplementary first indication element
329—supplementary second indication element
330—supplementary third indication element
331—proximal portion of button
332—distal portion of button
333—actuation surface of button
334—proximal end surface of lock ring
335—first portion of visual indicator
336—second portion of visual indicator
337—engagement surface
337a—engagement surface
337b—engagement surface
337c—engagement surface
337d—engagement surface
338—engagement element
339—first portion of engagement surface
340—second portion of engagement surface
341—third portion of engagement surface
342—fourth portion of engagement surface
343—angled surface of engagement element
344—protruding arms of button
345—circumferential blocking elements of spring guide
346—longitudinal blocking element of lock ring
347—central longitudinal axis
348—directional indicator
349—main body of lock ring
350—protrusion
351—direction of movement
352—direction of movement
353—circumferential direction 400—method
401—method step
402—method step

The invention claimed is:
1. A medicament delivery device comprising:
a proximal end and a distal end defining a longitudinal axis;
a body;
a button arranged at the proximal end and configured to actuate the medicament delivery device; and
a lock ring configured to rotate relative to the body about the longitudinal axis between a first position in which the button is not permitted to move along the longitudinal axis relative to the body, and a second position in which the button is permitted to move along the longitudinal axis relative to the body,
wherein movement of the lock ring from the first position towards the second position causes the button to move along the longitudinal axis relative to the body.

2. The medicament delivery device of claim 1, wherein the button is coupled to the lock ring such that the button is configured to rotate relative to the body about the longitudinal axis together with the lock ring.

3. The medicament delivery device of claim 1, wherein the lock ring is configured such that rotation of the lock ring from the first position towards the second position causes the button to move along the longitudinal axis relative to the body in a proximal direction away from the distal end, and the movement of the lock ring into the second position permits the button to be moveable along the longitudinal axis relative to the body in a distal direction towards the distal end.

4. The medicament delivery device of claim 1, wherein the button is moveable relative to the body along the longitudinal axis between an extended position in which a proximal portion of the button and a distal portion of the button are arranged to protrude from the lock ring, and a retracted position in which the proximal portion and the distal portion of the button are arranged inside the lock ring.

5. The medicament delivery device of claim 4, wherein the button is arrangeable in an intermediate position between the extended position and the retracted position, wherein when the button is in the intermediate position, the proximal portion of the button is arranged to protrude from the lock ring, and the distal portion of the button is arranged inside the lock ring.

6. The medicament delivery device of claim 5, wherein the lock ring and the button are configured such that when the lock ring is in the first position, the button is in the retracted position or in the intermediate position.

7. The medicament delivery device of claim 4, wherein the lock ring and the button are configured such that movement of the lock ring from the first position towards the second position causes the button to move into the extended position.

8. The medicament delivery device of claim 5, wherein the lock ring and the button are configured such that upon the lock ring reaching the second position, the button is movable into the retracted position or into the intermediate position.

9. The medicament delivery device of claim 5, wherein the lock ring and the button are configured such that when the lock ring is in the first position, the button is in the intermediate position, wherein moving the lock ring from the first position towards the second position causes the button to move from the intermediate position into the extended position, and wherein upon the lock ring reaching the second position, the button is movable into the retracted position.

10. The medicament delivery device of claim 4, wherein the proximal portion of the button comprises a first visual indicator, and the distal portion of the button comprises a second visual indicator that is different to the first visual indicator.

11. The medicament delivery device of claim 4, further comprising a spring configured to bias the button towards the extended position, and a spring guide configured to house and/or constrain the spring, wherein the spring guide is coupled to the body such that when the lock ring and the button rotate relative to the body about the longitudinal axis, the button is caused to rotate relative to the spring guide about the longitudinal axis.

12. The medicament delivery device of claim 11, wherein the spring guide comprises an engagement surface and the button comprises an engagement element arranged inside the lock ring and configured to move relative to the engagement surface, such that when the button is rotated relative to the spring guide about the longitudinal axis, the engagement element is caused to move along the engagement surface and to be guided thereby.

13. The medicament delivery device of claim 12, wherein the engagement surface comprises an angled surface that is angled relative to the longitudinal axis and relative to a circumferential direction about the longitudinal axis, wherein movement of the engagement element along the angled surface causes the button to move relative to the body along the longitudinal axis.

14. The medicament delivery device of claim 12, wherein the engagement element comprises a block, a wedge, or a roller.

15. The medicament delivery device of claim 12, wherein the engagement element comprises an angled surface configured to engage with the engagement surface.

16. The medicament delivery device of claim 12, wherein the engagement surface comprises a first portion that extends generally along a circumferential direction about the longitudinal axis, a second portion that is generally angled relative to the circumferential direction and the longitudinal axis, a third portion that is generally parallel to the longitudinal axis and is generally normal to the first portion, and a fourth portion that is generally parallel to the first portion and extends generally along the circumferential direction, wherein the second portion is arranged between the first and third portions, and the third portion is arranged between the second and fourth portions.

17. The medicament delivery device of claim 16, wherein relative to the longitudinal axis, the third portion has a different length to the second portion, such that the first portion and the fourth portion are spaced apart from one another along the longitudinal axis such that they are staggered relative to one another.

18. The medicament delivery device of claim 17, wherein the third portion is longer than the second portion, such that the first portion is arranged to be relatively closer to the proximal end and the fourth portion is arranged to be relatively closer to the distal end.

19. The medicament delivery device of claim 11, wherein the button comprises one or more protruding arms arranged to extend generally parallel to the longitudinal axis towards the distal end, wherein the one or more protruding arms are spaced apart from one another about the longitudinal axis and are each configured to engage with a respective one of one or more corresponding blocking elements of the spring guide and/or of the lock ring, in order to limit a rotational range of motion of the button relative to the body.

20. The medicament delivery device of claim 1, further comprising a medicament.

* * * * *